(12) United States Patent  (10) Patent No.: US 7,636,275 B2
Anno et al.  (45) Date of Patent: Dec. 22, 2009

(54) DIRECT TIME LAPSE INVERSION OF SEISMIC DATA

(75) Inventors: Phil Dean Anno, Houston, TX (US); Partha Sarathi Routh, Katy, TX (US)

(73) Assignee: ConocoPhillips Company

( * ) Notice: Subject to any disclaimer, the term of this patent is extended or adjusted under 35 U.S.C. 154(b) by 337 days.

(21) Appl. No.: 11/672,000

(22) Filed: Feb. 6, 2007

(65) Prior Publication Data

US 2008/0189043 A1  Aug. 7, 2008

(51) Int. Cl.
*G01V 1/38* (2006.01)

(52) U.S. Cl. .......................... 367/21; 367/38

(58) Field of Classification Search ............ 367/21, 367/38
See application file for complete search history.

(56) References Cited

U.S. PATENT DOCUMENTS

| | | | |
|---|---|---|---|
| 5,798,982 | A | 8/1998 | He et al. |
| 6,041,018 | A | 3/2000 | Roche |
| 6,212,952 | B1 | 4/2001 | Schweitzer et al. |
| 6,438,069 | B1 | 8/2002 | Ross et al. |
| 6,529,833 | B2 | 3/2003 | Fanini et al. |
| 6,549,854 | B1 | 4/2003 | Malinverno et al. |
| 6,556,922 | B2 | 4/2003 | Anno |
| 6,574,563 | B1 | 6/2003 | Nickel |
| 6,614,717 | B1 | 9/2003 | Khan et al. |
| 6,694,263 | B2 | 2/2004 | Fournier et al. |
| 6,735,526 | B1 | 5/2004 | Meldahl et al. |
| 6,864,890 | B2 | 3/2005 | Meek at al |
| 7,072,767 | B2 * | 7/2006 | Routh et al. .............. 702/14 |
| 2004/0199330 | A1 * | 10/2004 | Routh et al. .............. 702/14 |
| 2005/0073910 | A1 | 4/2005 | Cole et al. |
| 2005/0088914 | A1 | 4/2005 | Ren et al. |
| 2005/0090986 | A1 | 4/2005 | Van Riel et al. |
| 2005/0149267 | A1 | 7/2005 | Van Den Beukel et al. |

FOREIGN PATENT DOCUMENTS

WO   WO2005/006660   7/2005

OTHER PUBLICATIONS

Herawati, Ida. The Use of Time-Lapse P-Wave Impedance Inversion to Monitor a CO2 Flood at Weyburn Field, Saskatchewan. Masters Thesis. Colorado School of Mines. 2002.*

(Continued)

*Primary Examiner*—Mark Hellner

(57) ABSTRACT

A method and system of seismic data processing includes acquiring first and second prestack seismic datasets wherein the seismic datasets have a time-lapse relationship. The first prestack seismic dataset is inverted to determine a first source wavelet data set and a first reflectivity parameters data set. A perturbation data set is obtained by simultaneously minimizing an Lp-Norm between a portion of the first reflectivity parameters data set and reflectivity parameters for the second data set, an Lp-Norm between the first source wavelet data set and a source wavelet for the second data set and an Lp-Norm for data misfit between the first prestack seismic data set and the second prestack seismic data set. The perturbation dataset may be inverted for petrophysical parameters and for determining time-lapse changes in a reservoir.

16 Claims, 15 Drawing Sheets

OTHER PUBLICATIONS

Fang et al. A Dual Perturbation View of Linear Programming. Mathematical Methods of Operations Research (1996) 44: 1-9.*

Ahuja et al. Inverse Optimization. Operations Research. vol. 49. No. 5. Sep.-Oct. 2001. pp. 771-783.*

Routh, P., Anno, P., Baumel, R. and Chavarria, J., 2003, Inversion for source wavelet and AVA parameters from prestack seismic data, 73rd Ann. Mtg.: SEG 698-701.

Elde, R., Zachariassen, E., Sandoe, I. and Haaland, A., 2000, Troll West-Time lapse processing and analysis, 70th Ann. Internat. Mtg: Soc. of Expl. Geophys., 1433-1436.

Weisenborn, T. and Hague, P., 2005, Time-lapse seismic in Gannet A: The Leading Edge, 24, No. 1, 80-85.

McGillivray, P., 2005, Microseismic and Time-lapse Seismic Monitoring of a Heavy Oil Extraction Process at Peace River, Canada: Recorder, 30, No. 1, 5-9.

Ellison, S. J., Imhof, M. G., Coruh, C., Fuqua, A. D. and Henry, S. C., 2004, Modeling offset-dependent reflectivity for time-lapse monitoring . . . Geophysics, 69, 25-36.

Minkoff, S. E. , Stone, C. M., Bryant, S. and Peszynska, M., 2004, Coupled geomechanics and flow simulation for time-lapse seismic modeling: Geophysics, 69, 200-211.

Vasco, D. W., 2004, Seismic imaging of reservoir flow properties: Time-lapse pressure changes: Geophysics, 69, 511-521.

Vasco, D.W., Datta-Gupta, A,, Behrens, R., Condon, P. and Rickett, J., 2004, Seismic imaging of reservoir flow properties: Time-lapse amplitude: Geophysics, 69, 1425-1442.

O'Brien, J., Kilbride, F. and Lim, F., 2004, Time-lapse VSP reservoir monitoring: The Leading Edge, 23, No. 11, 1178-1184.

Gouveia, W. P., Johnston, D. H., Solberg, A. and Lauritzen, M., 2004, Jotun 4D: Characterization of fluid contact movement: The Leading Edge, 23, No. 11, 1187-1194.

Vesnaver, A., Accaino, F., Bohm, G., Madrussani, G., Pajchel, J., Rossi, G. and Dal Moro, G., 2003, Time-lapse tomography: Geophysics, 68, 815-823.

Sengupta, M., Mavko, G. and Mukerji, T., 2003, Quantifying subresolution saturation scales from time-lapse seismic: A reservoir monitoring case study Geophysics, 68, 803-814.

Swanston, A. M., Flemings, P. B., Comisky, J. T. and Best, K. D., 2003, Time-lapse imaging at Bullwinkle field, Green Canyon 65, offshore GOM: Geophysics, 68, 1470-1484.

Landro, M., Veire, H. H., Duffaut, K. and Najjar, N., 2003, Discrimination between pressure and fluid saturation changes from marine multicomponent : Geophysics, 68, 1592-1599.

Lumley, D. E., 2002, Synergies in time-lapse seismic, medical, and space imaging: The Leading Edge, 21, No. 6, 599-606.

Lumley, D., 2001, Time-lapse seismic reservoir monitoring: Geophysics, Soc. of Expl. Geophys., 66, 50-53.

Landro, M., 2001, Discrimination between pressure and fluid saturation changes from time-lapse seismic data: Geophysics, Soc. of Expl. Geophys., 66, 836-844.

Rickett, J. and Lumley, D. E., 2001, Cross-equalization data processing for time-lapse seismic reservoir monitoring: A case study from the GOM: Geophysics, 66, 1015-1025.

Huang, X., Will, B., Khan, M. and Stanley, L., 2001, Integration of time-lapse seismic and production data in a GOM gas field: The Leading Edge, 20, No. 03, 278-289.

Fanchi, J. R., 2001, Time-lapse seismic monitoring in reservoir management: The Leading Edge, 20, No. 10, 1140-1147.

Huang, X., 2001, Integrating time-lapse seismic with production data: A tool for reservoir engineering: The Leading Edge, 20, No. 10, 1 148-1 153.

Kirchner, A. and Shapiro, S.A., 2001, Fast repeat-modelling of time-lapse seismograms: Geophys. Prosp., Eur. Assn. Geosci. Eng., 49, 557-569.

Burkhart, T., Hoover, A. R. and Flemings, P. B., 2000, Time-lapse (4-D) seismic monitoring of primary production of turbidites at South Timbalier: Geophysics, 65, 351-367.

Koster, K., Gabriels, P., Hartung, M., Verbeek, J., Deinum, G. and Staples, R., 2000, Time-lapse seismic surveys in the North Sea and the: The Leading Edge, 19, No. 3, 286-293.

Johnston, D. H., Eastwood, J. E., Shyeh, J. J., Vauthrin, R., Khan, M. and Stanley, L. R., 2000, Using legacy seismic data in GOM: The Leading Edge, 19, No. 03 294-302.

Shatilo, A., 2000, A first attempt at monitoring underground gas storage by means of time-lapse multichannel transient electromagnetics: Geophys. Prosp., EAGE, 48, 489-510.

Zou, Y. and Bentley, L.R., 2003, Time lapse well log analysis, fluid substitution and AVO: The Leading Edge, 22, No. 6, 550-555.

Sherlock, D.H., McKenna, J., and Evans, B.J., 2001, Time-lapse monitoring of immiscible fluid-flow models: The Leading Edge, 20, No. 3, 300-307.

Sarkar, et al, 2003, SEG Expanded Abstracts, 22, p. 1489.

Boyd-Gorst, J., Fail, A. and Pointing, L., 2001, 4-D time lapse reservoir monitoring of Nelson Field, Central North Sea: The Leading Edge, 20, No. 12, 1336.

Anno, P.D., and Routh, P.S., 2004, Wavelet Without Wells-via Prestack Inversion, European Association of Geoscientists and Engineers, Paris, France.

de Waal, J.A. and Calvert, R.W., 2003, 4D-Seismic All The Way—Implementing Time Lapse Reservoir Monitoring Globally, 64th Mtg.: Eur. Assn. Geosci. Eng., H001.

Schuck, A., Rost, F., Czolbe, P. and Klafki, M., 2002, Time Lapse Seismic for the Development of an Underground Gas Storage, 64th Mtg: Eur. Assn. Geosci. Eng., H014.

Elde, R.M., Haaland, A.N. and Ro, H.E., 2001, Troll West Time Lapse—Latest News, 63rd Mtg.: Eur. Assn. Geosci. Eng., Session: F-18.

Winthaegen, P.L.A., Bolte, J.F.B. and Verschuur, D.J., 2001, Time Lapse Seismic Data Selection for Acquisition and Processing by Fresnel Zone Estimation, 63rd Mtg.: Eur. Assn. Geosci. Eng., Session: P667.

Elde, R., Zachariassen, E., Sando, I. and Haaland, A., 2000, Troll West-Time lapse processing and analysis, 70th Ann. Internat. Mtg: Soc. of Expl. Geophys., 1433-1436.

Hartung, M., Rozemond, J., Strijbos, F., Verbeek, J. and VanWaarde, J., 2000, Successfull Introduction Of New 4DTtechnology Into The Business Time Lapse Seismic In Gannet-C, 62nd Mtg.: Eur. Assn. Geosci. Eng., Session:X0051.

Mazzoti, A., Stucchi, E. and Ciuffi, S., 2000, Time Lapse Seismic Amplitude Studies—Preliminary Results From A North Sea Dataset, 62nd Mtg.: Eur. Assn. Geosci. Eng., Session:X0056.

* cited by examiner

Original Survey Wavelet

Time Lapse Survey Wavelet

DIRECT TIME LAPSE INVERSION OF SEISMIC DATA

BACKGROUND

1. Technical Field

The present disclosure generally relates to methods and processing in the field of seismic data, and particularly to inversion of data sets collected over multiple time periods.

2. Background Information

Traditional approaches to time lapse analysis in oil and gas industry are based on data differencing procedures either in the poststack or prestack domain. Although these methods have provided the oil industry a quantitative approach to evaluate the changes for better reservoir monitoring decisions the analysis suffers from several limitations. These limitations arise primarily due to the practicality of data acquisition and processing steps that makes the data sets incompatible to apply a simple differencing approach.

Time lapse imaging is an established technique in many branches of science and engineering. Practical applications of time lapse can be found in diverse areas such as medical imaging, astronomy, geophysical exploration, hydrology and optical imaging. The fundamental ability to study the dynamic nature of physical processes is a central theme of a time lapse problem. In oil and gas reservoir monitoring, time lapse seismic is well accepted. It is recognized as a key reservoir management tool in the petroleum industry. Several applications such as production changes in reservoir, mapping bypassed oil, monitoring costly injection programs, heavy oil monitoring, time lapse tomography and improving our understanding of reservoir compartmentalization and the fluid flow properties across faults have significantly benefited from time lapse studies commonly known as 4D seismic.

As illustrated in FIG. 1, the basic idea in time-lapse monitoring is to acquire multiple seismic surveys at various times over a known hydrocarbon reservoir 3. The subsurface physical properties caused by fluid flow in the reservoir 3 during oil production may be delineated by the differences in the surveys between one acquisition time to another.

From an acquisition point of view this requires a high degree of repeatability in the seismic acquisition, followed by careful image processing of time lapse data sets to minimize non-repeatable data and processing artifacts in the images. It is followed by calibration of time lapse seismic anomalies with production fluid flow via petrophysical modelling and analysis. Current practice in 4D analysis is based on analysis of data difference directly as seismic amplitude difference maps. Some approaches utilize the amplitude difference maps in two ways: (a) develop a qualitative interpretation indicating possible regions where fluids are flowing in the reservoir, sometimes constrained by supporting data such as geologic control, well logs and engineering production information or (b) invert the amplitude changes from data differences (e.g. subtraction) to obtain maps of pressure and saturation change.

Maps of pressure and saturation change or volumes are calibrated with physical units of saturation and pressure that can assist engineering work flows and reservoir management decisions. Regardless, prior approaches depend on data difference as the input. The latter approach i.e. conversion of the difference amplitude maps to saturation and pressure maps is advocated by many workers in this field and is commonly known as time lapse inversion.

Time-lapse images are often replete with artifacts of whichever time-lapse methodology was undertaken, artifacts that are unrelated to actual flow through the reservoir. These artifacts introduce uncertainty into the interpretation of flow fronts and can greatly diminish the value of the time-lapse data. The artifacts originate from seismic signal and noise which cannot be, but, ideally should be exactly repeated from one survey to the next. Practical limitations of existing seismic acquisition and processing technology limit the repeatability of seismic data.

Current time-lapse imaging methodologies inherently assume perfect seismic repeatability. These methodologies depend on subtraction of data (or images) from repeated surveys to localize changes in properties to the time interval between surveys. These subtraction-based methodologies therefore assume that repeated signal and noise will subtract to zero at positions in the reservoir where fluid saturation and pressure have not changed over time.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

In one embodiment a method of seismic data processing to obtain a time lapse data volume includes acquiring a first prestack seismic dataset and a second prestack seismic dataset wherein the second prestack seismic dataset has a time-lapse relationship to the first prestack seismic dataset. The first prestack seismic dataset is inverted for determination of a first source wavelet data set and a first reflectivity parameters data set. This may be termed a reference inversion. A perturbation data set is obtained by simultaneously minimizing an Lp-Norm between a portion of the first reflectivity parameters data set and reflectivity parameters for the second data set, an Lp-Norm between the first source wavelet data set and a source wavelet for the second data set and an Lp-Norm for data misfit between the first prestack seismic data set and the second prestack seismic data set.

In another embodiment a method of seismic data processing to obtain a time-lapse data volume includes acquiring a first prestack seismic dataset and a second prestack seismic dataset wherein the second prestack seismic dataset has a time-lapse relationship to the first prestack seismic dataset. A reference inversion is determined by inverting the first prestack seismic dataset for determination of a first source wavelet data set and a first reflectivity parameters data set. A perturbation data set (or time-lapse dataset) is obtained by simultaneously minimizing an L1-Norm between a portion of the first reflectivity parameters data set and reflectivity parameters for the second data set, an L2-Norm between the first source wavelet data set and a source wavelet for the second data set and an L2-Norm for data misfit between the first prestack seismic data set and the second prestack seismic data set. The obtained time-lapse dataset output is recorded in a form for display.

In still another embodiment a set of application program interfaces embodied on a computer readable medium for execution by a processor for calculating a direct time-lapse inversion data set to locate temporal changes in subsurface reservoirs includes a first interface that receives a first prestack seismic dataset and a second prestack seismic dataset wherein the second prestack seismic dataset has a time-lapse relationship to the first prestack seismic dataset.

The set of application interfaces also includes a second interface that receives a first source wavelet data set inverted from the first prestack seismic dataset, a third interface that receives a first reflectivity parameters dataset inverted from the first prestack seismic dataset and a fourth interface that receives a perturbation dataset determined from a simultaneous minimization of an L1-Norm between a portion of the first reflectivity parameters data set and reflectivity parameters for the second data set, an L2-Norm between the first source wavelet data set and a source wavelet for the second data set and an L2-Norm for data misfit between the first prestack seismic data set and the second prestack seismic data set.

BRIEF DESCRIPTION OF THE DRAWINGS

The following drawings illustrate some of many possible embodiments in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1:
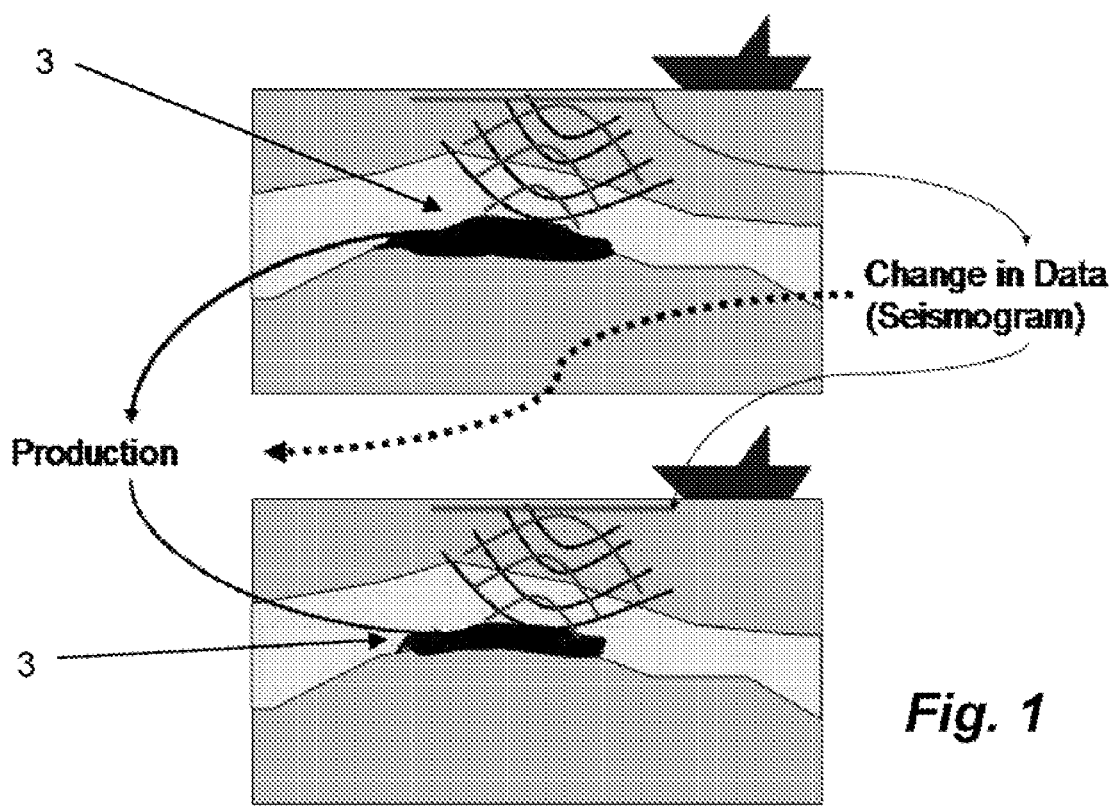
FIG. 1 is a diagrammatic before and after representation of seismic data acquisition over a subsurface reservoir before and after production.

A non-limiting illustrative embodiment of a time lapse inversion for determining subsurface reservoir changes is presented through one or more of its various aspects such as those noted below. Particular non-limiting embodiments related to direct time lapse inversion and model-difference time lapse inversion are described.

Embodiments disclosed herein and equivalents that will be apparent to practitioners in the art provide for robustly estimating changes in seismic properties associated with movement of fluids through subsurface reservoirs. Oil, gas, and water flow through reservoirs as these fluids are produced from or injected into the subsurface. Subsequent changes in fluid saturation and pressure likewise produce changes in seismic properties. Collocated time-lapse seismic surveys are recorded to image these changes in saturation and pressure, indicated indirectly through changes in seismic properties. Methods and systems as described herein improve imaging of the location and magnitude of these changes, leading to improved understanding of flow through the reservoir and optimized recovery of hydrocarbons.

A time lapse seismic survey uses multiple 3D seismic datasets acquired at different times (e.g., before and after production) to detect reservoir changes. Images of physical property variations with time are thereby obtained for a region of the Earth. Depending on what factors cause the time lapse change in a reservoir, the information is very valuable for reservoir monitoring, planning and management. If reservoir changes occur due to production in the time interval between repeat seismic surveys, these changes may be detected using multiple seismic data sets.

The ability to detect these changes using a dataset differencing approach (such as sample to sample subtraction for substantially coincident trace positions) may depend on various factors including signal to noise ratio and data processing. If processing performed on data sets acquired at different times is variable or inconsistent between the datasets, then image differences in the data may indicate differences are present in regions where there has been no actual change in the Earth properties. Therefore, careful processing of multiple data sets is a key step if meaningful changes in reservoir properties are to be extracted. However, sufficiently accurate and consistent data processing across multiple datasets in time lapse processing may be very difficult to achieve. Even after careful data processing differences may exist between time lapse data sets in regions where change is not expected. When these unexpected changes occur, any temporal reservoir changes indicated by the inverted data may become suspect.

A goal in time lapse monitoring is to extract the reservoir changes due to production in the presence of noise and acquisition variations in a stable manner. This reduces false anomalies and the risk of misinterpretation and provides more accurate information for planning and management of a producing reservoir.

Figure 2:
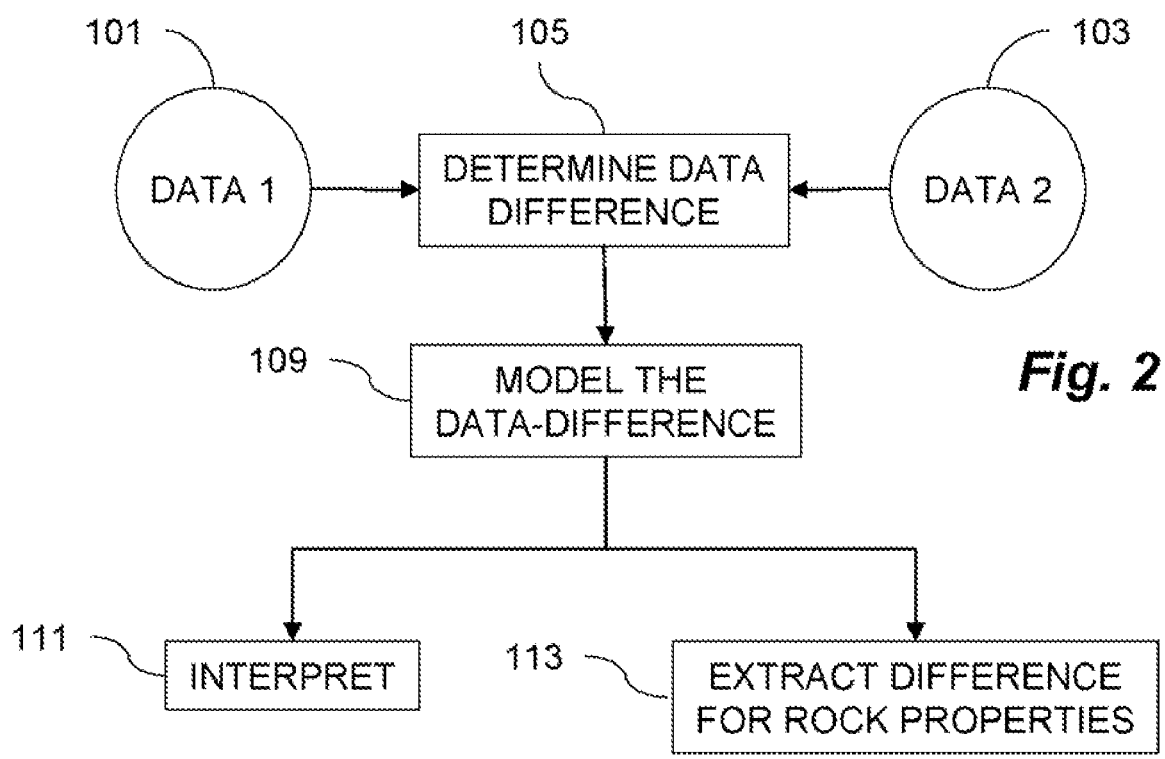
FIG. 2 is an illustration of a data differencing procedure.

In the example data subtraction-based workflow illustrated in FIG. 2, data from a first dataset 101 are subtracted from a second dataset 103 to determine a data difference 105. The data difference 105 is then modeled or otherwise inverted 109. Some workflows drop the inversion step and treat data differences 105 as the time-lapse image. In other subtraction-based workflows data from both surveys are inverted independently followed by image subtraction. The image 105 or inverted data 109 may be directly interpreted 111 or rock properties may be determined 113 from the data-difference information.

The data differencing procedure illustrated in FIG. 2 is applicable in either the post-stack or prestack domain. In data differencing two processed data sets are subtracted to highlight changes in the subsurface over time which may be due to reservoir production. A crucial requirement in a straight data set differencing procedure is to process different data sets acquired at different times to ensure (or to force) compatibility so that ideally only changes due to production are visible in the differenced images. Various cross-equalization processing techniques such as matched filtering, transfer functions, phase balancing, and amplitude scaling procedures may be used so that the changes in the reservoir can be adequately obtained from differenced data. These changes may be either directly interpreted from the difference data or the data are inverted to extract an estimate of saturation or pressure changes in a reservoir as shown in 113 of FIG. 2.

Normalizing procedures applied to datasets including processing algorithms such as cross-equalization techniques cannot take into account all of the changes between two surveys. Although significant effort may be made to acquire multiple datasets that have similar wave propagation characteristics it is often very difficult to achieve compatibility between data sets via data acquisition and/or processing. Many factors in data acquisition and processing lead to incompatibility that can easily mask temporal changes due to production. For example the factors between different surveys that make the difference driven processing challenging are: (a) differences in the strength of the source signatures (b) phase changes between data sets, (c) changes in the source bandwidth between surveys, (d) kinematical differences that can cause time shifts and (e) changes in the near-surface heterogeneity. Combinations of these factors pose processing challenges to make the data sets compatible and are likely to result in misleading anomalies across alt areas when two data sets are differenced.

In one non-limiting embodiment a direct time-lapse estimate of reflectivity parameters or high resolution amplitude versus angle (AVA) parameters: for example intercept, gradient and higher order AVA parameters (such as density) from prestack data are determined without data differencing. Having obtained the AVA parameters, a linear inversion approach may be used to obtain impedance, Poisson's ratio and density from the AVA parameters. These two steps i.e. (a) nonlinear inversion of AVA parameters and (b) linear or nonlinear inversion (depending on a chosen mapping) may be used to extract elastic or petrophysical properties from AVA parameters. These steps may be included in this direct time lapse inversion approach.

The output from the direct time lapse inversion may be interpreted or a next step may be similar to a pressure-saturation inversion step, for example converting the inverted elastic parameters (i.e. impedance, Poisson's ratio and density) to saturation and pressure using appropriate rock physics relation. This may be referred to as rock-physics time lapse inversion. Petrophysical parameters that may be inverted for, in addition to those delineated previously, are well known in the art and include permeability, porosity, shear modulus, Lame's constant, Young's modulus and fluid saturations.

Direct time-lapse inversion relaxes repeatability assumptions of data differencing approaches, greatly reducing artifacts and uncertainty in the resulting time-lapse images. This improvement is particularly evident for time-lapse images relative to the pre-production conditions of the reservoir. This may be particularly important because pre-production seismic data sets have usually been recorded through a legacy seismic survey that are prone to particularly poor repeatability.

Direct time lapse inversion methods directly image changes over time in seismic properties for a target model relative to an initial or reference subsurface model. The assumption of perfect repeatability is thereby relaxed by eliminating subtraction from the time-lapse imaging methodology. That is, subtraction between two surveys is replaced with inversion of a monitor survey relative to prior information, the reference model. The second or target dataset is inverted for 1) its own wavelet, 2) the change in the earth model, and 3) the target dataset's own data misfit. These inversions may be particularly effective for obtaining a time-lapse dataset when they are undertaken simultaneously.

The direct time-lapse inversion workflow effectively updates the reference model at those positions where a change in properties is required to model the monitor data. The resulting image localizes any time lapse in properties to the time interval between the monitor survey and the time associated with the reference.

The reference model for direct time-lapse inversion may be developed from the highest-resolution seismic survey (normally not the legacy or oldest survey). With this choice of reference a monitor survey need only be repeatable to within the spatial and temporal resolution limits of the monitor data. This choice places non-repeatable signal from small positioning errors within the null space of the modeling operator, below these resolution limits. That is to say, no update to the reference model will be required to explain a small positioning error in the monitor data. This helps eliminate or suppress a time-lapse artifact commonly generated by subtraction-based methods, especially important when a poorly positioned legacy survey is involved.

To fully realize the benefit of this relaxed repeatability requirement, one aspect of a nonlimiting embodiment of direct time-lapse inversion includes inversion for the effective wavelet in the monitor data. Variability in the wavelet between repeat surveys and within the same survey masquerades as non-repeatable signal. Wavelets of the legacy survey routinely deviate substantially from repeat surveys. Inversion for the wavelet helps to properly interpret and account for this form of non-repeatability. One nonlimiting embodiment of direct time-lapse inversion associates wavelet-induced variability in the data with the modeling operator rather than with time lapse variations in the subsurface model. Subtraction-based methods necessarily misinterpret wavelet-induced variability as a change over time in subsurface properties.

Direct time-lapse inversion also provides benefits by operating on data with a greater signal-to-random-noise (S/N) ratio. This is because the data from any single monitor survey has greater S/N than the difference of data between repeat surveys. That is, time-lapse methods based on subtraction of repeated data remove most of the signal while only slightly decreasing random noise. The resulting reduction in S/N of the input to subtraction-based inversion correlates directly to a reduction in the certainty of the output—the time-lapse image. Direct time-lapse inversion acts on input data with fundamentally greater S/N thereby producing changes in seismic properties with fewer artifacts and greater certainty.

Direct time-lapse inversion is particularly effective for imaging changes in seismic properties relative to the original legacy survey over the field. This time-lapse methodology is therefore much better suited than data differencing approaches for imaging changes in relation to the preproduction conditions of the field. A good understanding of changing reservoir conditions early in the life of a field is always crucial for optimal reservoir management.

Direct time lapse inversion methods provide the ability to invert for source signature and reflectivity (or AVA parameters) from the prestack gathers simultaneously. While common image gathers are used as an exemplary example, it will be recognized that any arbitrary prestack seismic gather may be used with these inversions. The inversion may be undertaken as a nonlinear inverse problem. Source signatures include summaries of the wave propagation effects whereas AVA parameters convey the physical property information. Subsurface models may be built by inverting the AVA parameters.

Figure 3:
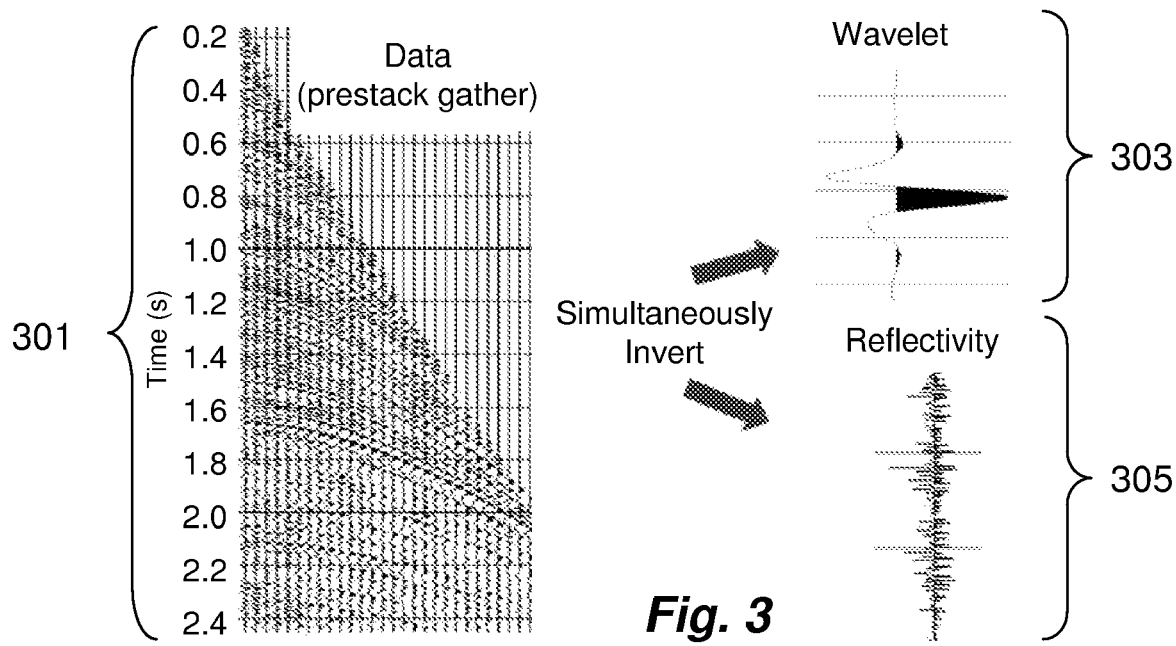
FIG. 3 is a non-limiting schematic representation of inverting seismic data to obtain a wavelet and to obtain reflectivity parameters.

FIG. 3 illustrates a schematic diagram for a prestack inversion that may use differential moveout information (or the non-parallel moveout) inherent in the pre-stack seismic data 301 to obtain a separation between source wavelet 303 and AVO parameters (reflectivity) 305. The interfering wavelets at larger offsets provide information that allows separation of the reflectivity from source effect. The inversion may be formulated as a time-domain rather than depth-domain process. Depth-domain processing may be used to augment the pre-processing for the time domain process. The velocity field may be determined or may be known from other analysis. Reflectivity may be parameterized in terms of intercept and gradient, rather than an arbitrary function of reflection angle. These simplifications may improve computing cost, robustness, and uniqueness of a solution.

The forward model may be expressed as a convolution between a source wavelet and amplitude variation with offset (AVO) parameters and therefore handles primaries-only data. Preprocessing is performed to make input data conform to the forward modeling algorithm. This includes attenuation of multiples, removing non-hyperbolic moveout such as anisotropic effects and velocity analysis to ensure that the events have hyperbolic moveouts. The inversion aims to recover three types of model parameters (1: source, 2: intercept and 3: gradient) from a multioffset gather. The problem posed is underdetermined having more parameters than data, with more data in actual practice. But, due to inadequate data around the narrow-aperture events in a gather, the data constraint is weak on any model resulting in an ill-conditioned system of equations and an effectively underdetermined, nonunique solution.

Figure 4:
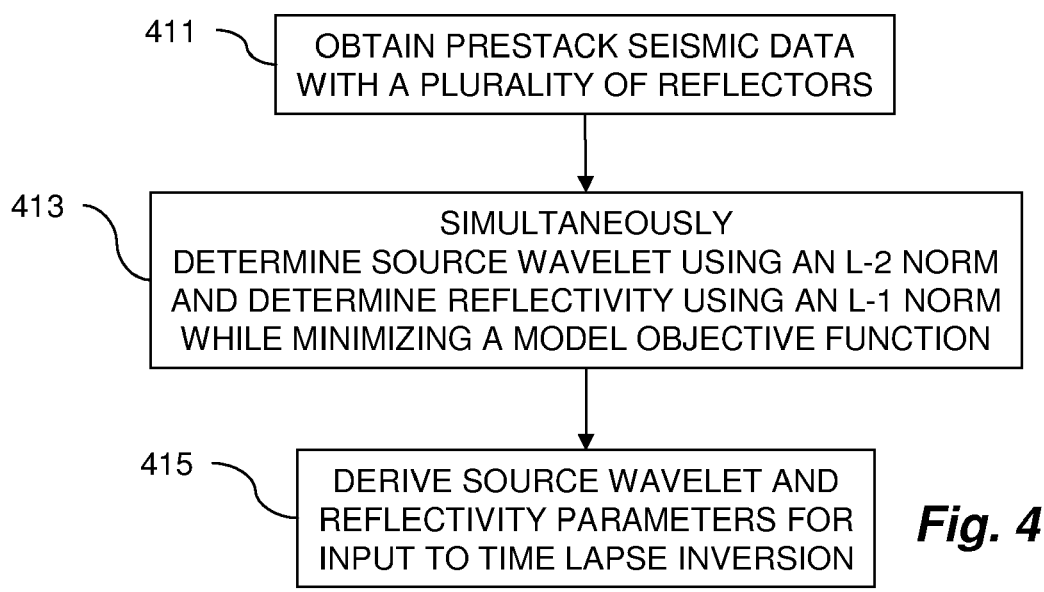
FIG. 4 illustrates a flowchart for obtaining a wavelet and reflectivity parameters from seismic data.

FIG. 4 illustrates a flow chart for simultaneously inverting seismic data that comprises obtaining prestack seismic data 411 simultaneously inverted to determine a source wavelet and reflectivity 413 to derive the source wavelet and reflectivity parameters 415 for use as input parameters for direct time lapse inversions. In one non-limiting embodiment the inverse problem may be formulated by minimizing an L1 norm of AVA parameters and an L2 norm of source wavelet subject to fitting the data. The resulting inverse problem is nonlinear and may be solved using an interior point algorithm as described in U.S. Pat. No. 7,072,767, titled "Simultaneous inversion for source wavelet and AVO parameters from prestack seismic data." The subject matter of U.S. Pat. No. 7,072,767 is hereby included by reference in its entirety.

In one embodiment the forward model is a convolution of the source wavelet and angle dependent reflectivity. It is well recognized that this is a non-unique problem when both source and reflectivity are inverted simultaneously. Although the differential moveout information allows us to separate the source and the reflectivity in a spectral sense for smoothly varying background velocity, it does not allow us to solve for an arbitrary scale factor that may exist between them. Consider the frequency domain equation for the forward model where the data $u(x,\omega)$ may be represented as $$u(x,\omega)=S(\omega)r(\omega,\theta(x))=S(\omega)/\alpha(\alpha r(\omega,\theta(x)),$$

where $S(\omega)$ is the source and $r(\omega,\theta(x))$ is the angle dependent reflectivity parameterized in terms of intercept and gradient. If the source is divided by a constant and the reflectivity multiplied by a constant the same response may be obtained. Therefore either the source or the reflectivity can become arbitrarily small or large without affecting the data. Additionally, the wavelet may be constrained by modeling or algorithmic considerations so that it does not change significantly within adjacent CIP's.

Faced with this non-uniqueness, a two pass inversion procedure with an intermediate step of wavelet processing provides an average wavelet for a set of CIP gathers. In one non-limiting embodiment the procedure for obtaining and using an average wavelet may be described with three steps: 1) Invert for Unbiased Wavelets with small amplitude random starting wavelets as initial model, 2) Process the wavelets obtained for a plurality of CIPs to determine an average wavelet; and 3) Invert with the average wavelet as the reference model to obtain high resolution AVA parameters.

An estimate of an effective source wavelet is also available from this process. The source wavelet information is important since it includes many wave propagation effects not taken into account in a simple convolution forward model. Unlike the convolutional model assumptions this estimate of the source wavelet does not depend on the knowledge of the Earth properties or statistical assumptions of the reflectivity model.

Other approaches to estimate the source include: spiking deconvolution, fourth-order cumulant matching, estimating source from well logs, source extraction from water bottom reflections and source extraction from strong reflectors like top of salt. Some of these methods rely on the knowledge of an earth parameter to deconvolve the source signature and other methods (like fourth order cumulant) rely on statistical information in the data to extract the source wavelet. If the assumptions about the earth parameters are incorrect or the statistical assumptions of the data are violated, then it can lead to incorrect estimation of the source and source characteristics.

In contrast, the two pass inversion procedure does not suffer from these assumptions and provides a minimum energy effective wavelet that will satisfy the data.

In a time lapse problem different propagation effects can lead to changes in the effective source wavelet. Therefore the ability to extract source signature directly from the data provides tremendous flexibility to account for changes that are not related to physical property changes in the Earth. For example, changes in bandwidth, strength of source, phase shifts in data, time shifts due to near surface heterogeneity can be absorbed into the effective source wavelet without affecting the Earth properties. Thus the simultaneous inversion for source and AVA parameters in the time lapse inversion procedure provides flexibility to decouple the physical property changes from propagation related changes in the data. This simultaneous inversion provides a significant advantage in formulating a time lapse inversion problem and determining time lapse reservoir changes.

In another aspect an embodiment of a direct inversion methodology may be used to detect changes in a reservoir via simultaneous inversion of source wavelet and AVA parameters from prestack seismic data. The method may be formulated as an inverse problem to detect time-lapse changes in the reservoir by imposing temporal continuity.

Figure 5:
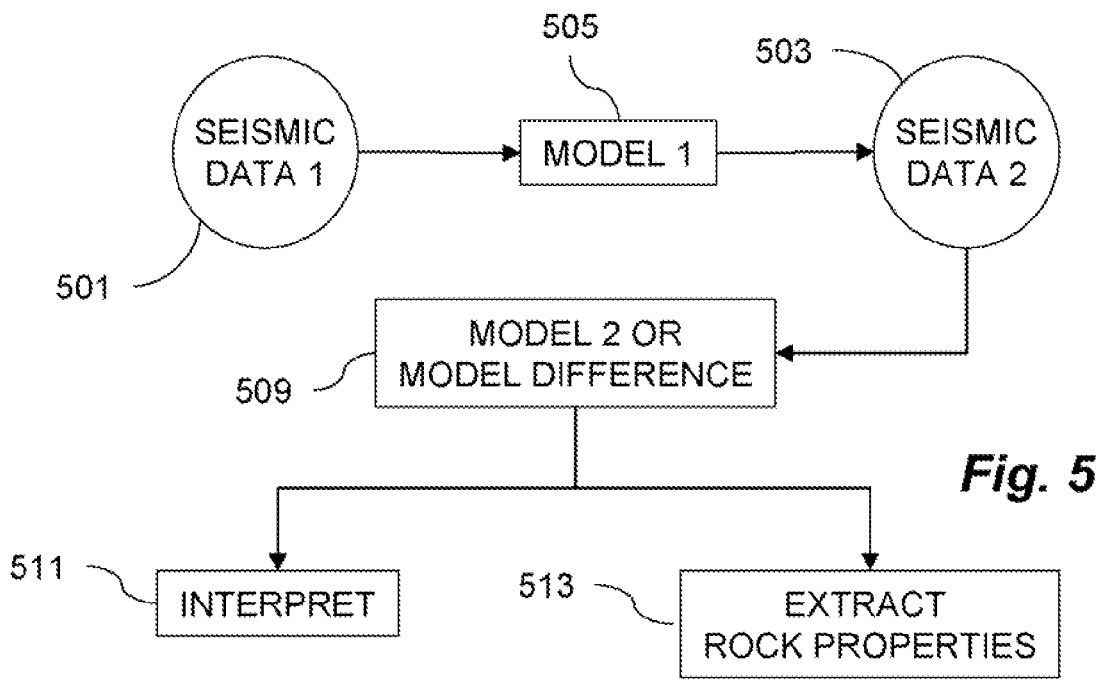
FIG. 5 is a flow chart illustrating a non-limiting embodiment of direct time-lapse inversion.

FIG. 5 is a flow chart that illustrates an embodiment of direct time-lapse inversion. A first data set 501 is inverted for source wavelet and reflectivity parameters for input used to obtain a first or reference model 505. Reference model 505 may include high resolution AVA parameters. The model 505 is input as a reference model to combine with a second dataset 503. The second data set 503 is inverted for source wavelet and reflectivity parameters. A second model 509 or model difference is determined by minimizing an objective function to provide a perturbation dataset for interpretation 511 or model 609 may be used as input for extracting petrophysical parameters 513 based on time-lapse changes.

Inverting for a source wavelet from a prestack seismic data set which may be any prestack seismic gathers (a non-limiting example is common image point (CIP) gathers) provides a unique advantage to overcome some of the limitations of the data differencing methods. The effects due to change in source bandwidth, strength of the source, time shifts and other propagation effects are absorbed in the effective source wavelet after inversion. Thus for two surveys that are affected by different propagation characteristics, the inverted wavelets will absorb the changes leaving the AVA parameters unaffected. The individual data sets are independently inverted to generate their respective source wavelets. After the wavelets are extracted for each data set, the time lapse inversion is performed.

In addition to independent wavelet extraction, temporal continuity of the AVA parameters between surveys may be imposed. This allows robust recovery of the anomalous changes due to production. Ideally, the Earth model (or the geology) is expected to change little or not at all between two surveys except for the regions where oil and gas are extracted from a reservoir during production. Therefore the inverse problem minimizes a model objective function to minimize a particular measure (for example an L1 norm) between the time lapse AVA model and the base AVA model subject to fitting the data.

Broadly this procedure can be described in two steps: First, the base survey data are inverted to obtain a base AVA model and base source wavelets. The base source wavelets contain all of the propagation effects that are related to survey parameters such as bandwidth, source strengths, time shifts and attenuation due to scattering. The inversion procedure to achieve this step is described in U.S. Pat. No. 7,072,767.

In the second step, the base AVA model is input as the starting and reference model in the inversion of the new data set. This step constitutes the time lapse inversion procedure where a model objective function is minimized subject to fitting the new data. The Lp-norm between the desired AVA model and the base AVA model may be chosen as the model objective function. For AVA parameters L1-Norms may normally be chosen. Including the base AVA model as a reference model in the inversion provides a temporal continuity in the results. Ideally, the Earth model (here the AVA parameters) will remain the same except in the producing regions. Imposing this norm ensures that the new model will only deviate from the base model when there is sufficient time lapse response due to production changes. "Sufficiency" of course depends on signal to noise ratio of the time lapse response. If the new data set has different bandwidth, scale and time shifts then all of those effects are absorbed in the inverted wavelets without contaminating the AVA parameters to produce false anomalies. This provides a definite advantage over a data differencing approach.

An alternative approach, a nonlimiting embodiment representing a model-difference time lapse inversion, provides for determining the time lapse change in the post data inversion stage. For each data set the wavelets are extracted independently, similar to the direct time lapse inversion procedure. In this procedure the different data sets are independently inverted for the AVA parameters. Instead of imposing the temporal continuity using the model objective function the models obtained from independent inversions are subtracted. Note that this post inversion model differencing is different than data differencing procedure (e.g., subtracting one dataset from another dataset) and this model differencing is more stable. The stability is achieved because the wavelet effects are removed from the data and therefore the model differencing at the post inversion stage is sensitive to the physical property changes.

Figure 6:
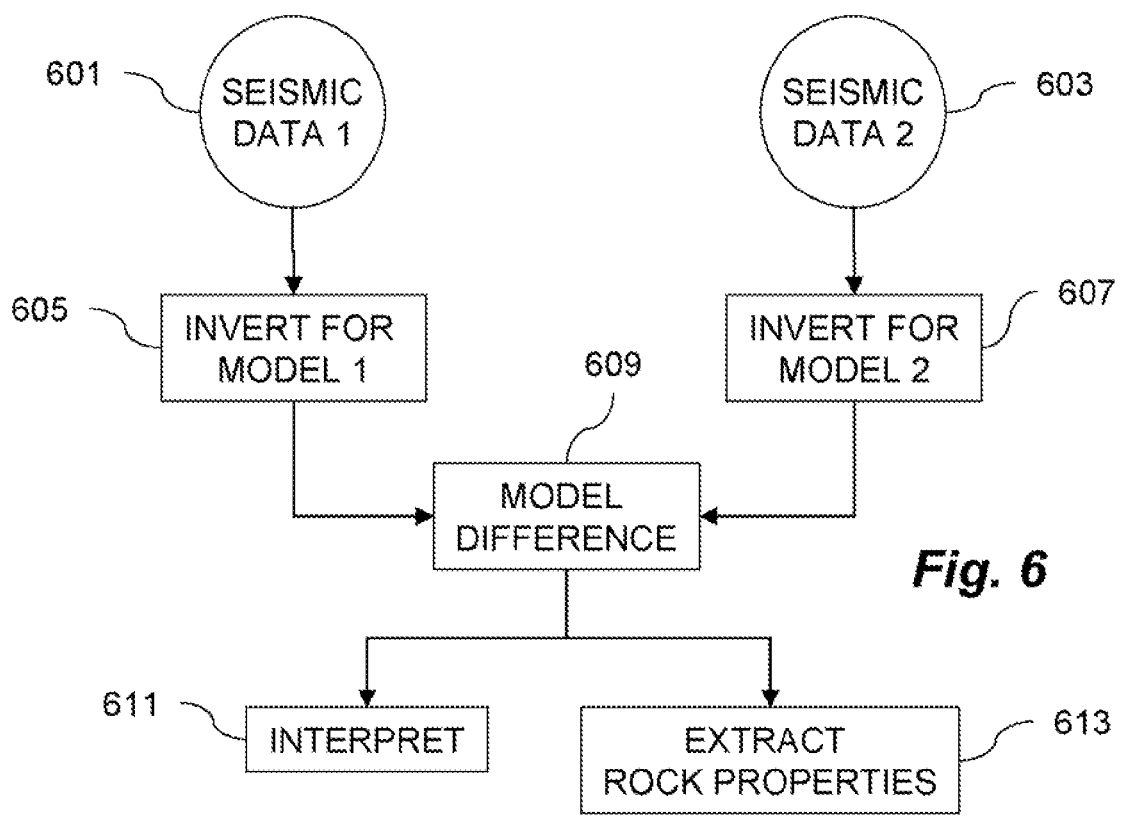
FIG. 6 is a flow chart illustrating a non-limiting embodiment of model-difference time-lapse inversion.

FIG. 6 is a flow chart illustrating a nonlimiting embodiment of the model-difference time lapse inversion procedure. A first dataset 601 in inverted to obtain a first model 605. A second dataset 603 is inverted to obtain a second model 607. The difference between the two models is obtained and the resulting model difference 609 may be directly interpreted 611 or further inverted to obtain petrophysical properties 613.

The direct-time lapse inversion technology may be applied to synthetic data. The synthetic examples are generated from a real data set. The four synthetic examples herein indicate the processing related effects may be well handled using the time lapse inversion approach. These synthetic results are generated based on the problems typically encountered in a time lapse problem.

Example (a) Bandpass and Scale Test: It is common that repeat seismic surveys in an area are separated by many years. Seismic survey datasets separated in time by 5 to 10 years are not uncommon. Due to continual improvement in data acquisition technology, recent data sets are generally of high quality compared to the older ones. Changes in bandwidth, energy of the source, spatial resolution and overall data quality tend to make the data sets incompatible between two different times. For example two data sets with different bandwidth and scale information likely owe their differences to different acquisition parameters.

Figure 7:
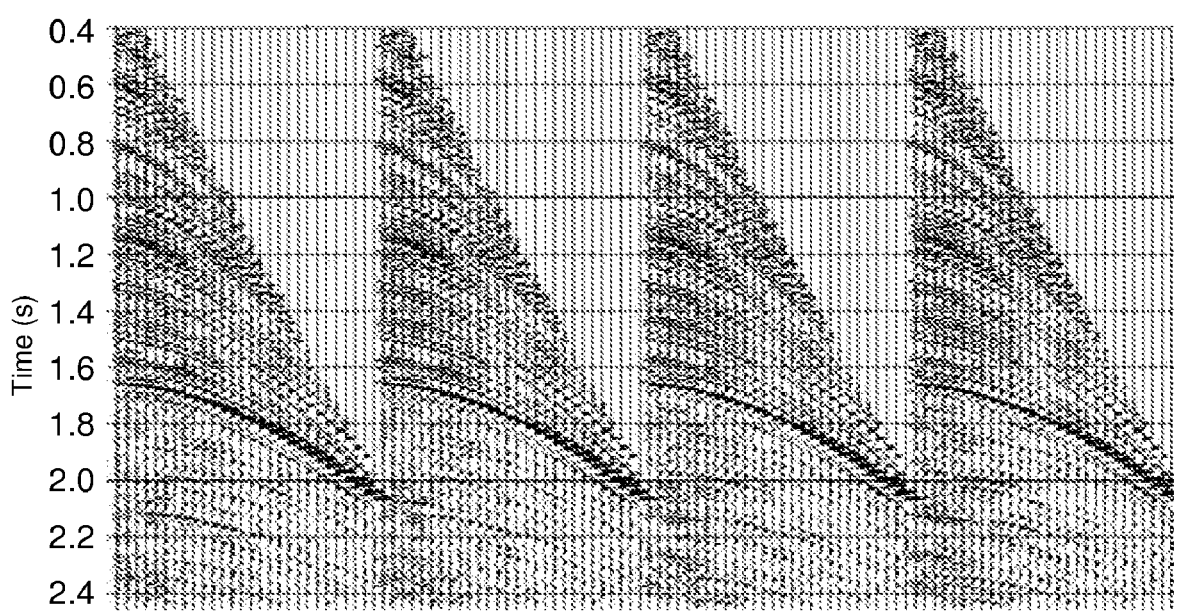
FIG. 7 illustrates representative gathers from a field data set for a synthetic time lapse test.

FIG. 7 illustrates representative gathers from a field data set for synthetic time lapse test. To simulate the changes in bandwidth and scale, the original data in FIG. 7 is bandpass filtered. The resulting filtered data are shown in FIG. 9, illustrating the band pass filtered data of FIG. 7 using a low pass filter (60-100 Hz).

Figure 8A:
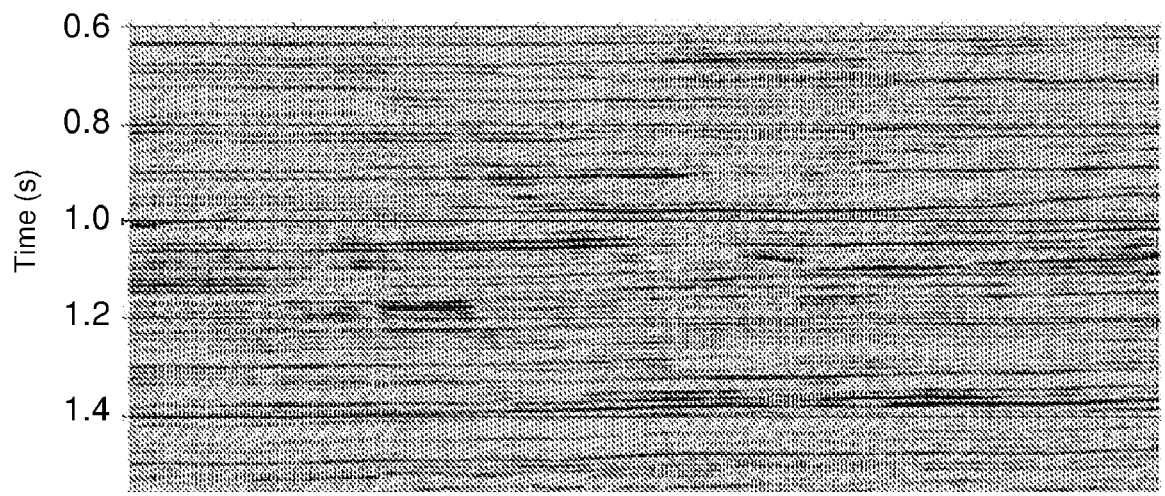
FIG. 8A illustrates an inverted intercept section from the base field data set.
Figure 8B:
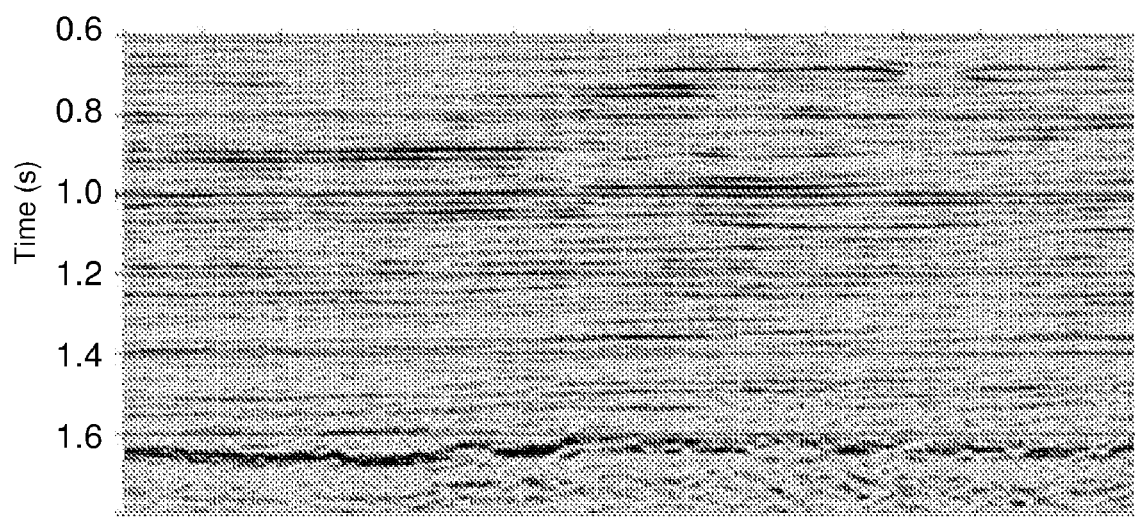
FIG. 8B illustrates an inverted gradient section from the base field data set.

Before examining the time lapse response, the first step is to invert the base data set. The higher quality (non-band limited) data are arbitrarily chosen to be the base data set for time lapse study. The base data set is inverted using a two-step procedure to obtain the wavelets and consequently the AVA parameters. FIG. 8A illustrates an inverted intercept section from the base field data set. FIG. 8B illustrates an inverted gradient section from the base field data set. The inverted intercept and gradient sections shown in FIG. 8A and FIG. 5B indicate that intercepts have better resolution compared to the gradients—a natural consequence of data sensitivity. The intercept and gradient sections in FIG. 8A and FIG. 8B become the reference or base model for the time lapse inverse problem.

Figure 9:
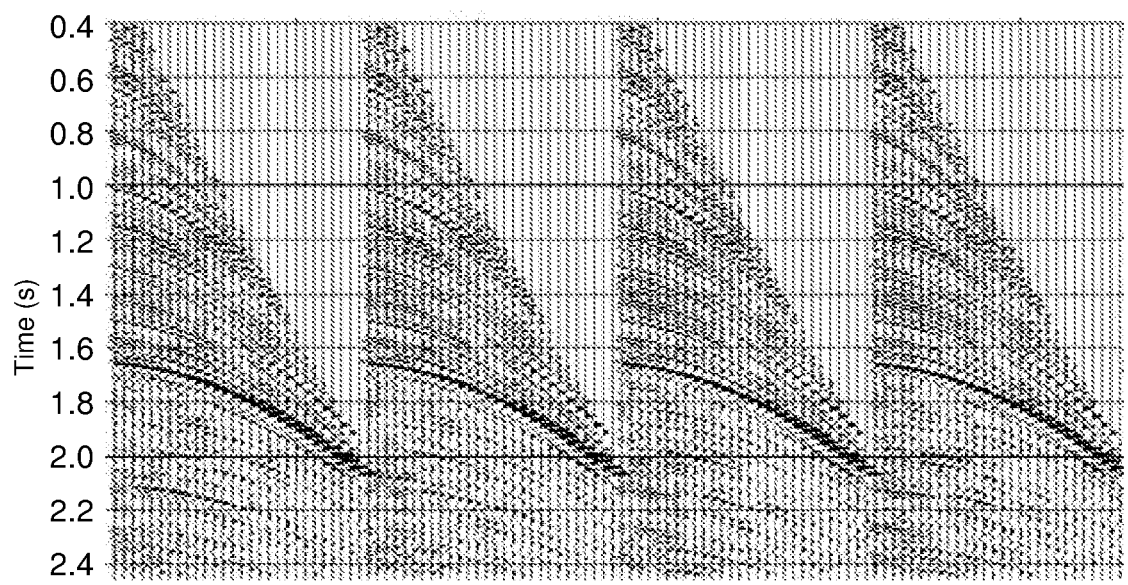
FIG. 9 illustrates bandpass filtered data of FIG. 7.
Figure 10:
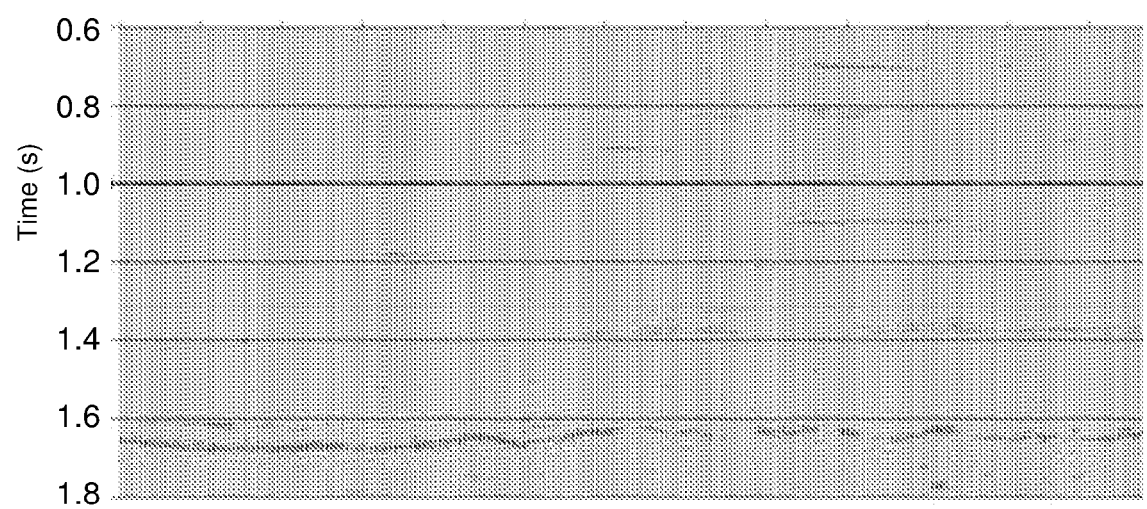
FIG. 10 illustrates intercept perturbation (changes) from direct time lapse inversion.

Before inverting the band limited data for time lapse response the wavelets are first extracted from the band limited data (as illustrated in FIG. 9) using the first step of the non-linear prestack inversion algorithm. The new wavelets obtained from the band limited data will indicate the band limitation as well as any change in scale. The inverted wavelet (not shown) is used for the time lapse inversion with the base intercept and gradient model in FIG. 8A and FIG. 8B. Ideally, there should not be any change in inverted intercept and gradient perturbation. However, due to noise in data variability with CIP location a slight energy in the perturbation section may occur especially in the basement reflector region. Over long time windows the wavelet(s) used may sometimes not be adequate for a low frequency, large amplitude basement reflector. FIG. 10 illustrates intercept perturbation (changes) from direct time lapse inversion. The perturbation section for intercept in FIG. 10 is plotted in the same scale as FIG. 8A. The section shows low energy throughout because there are no time lapse changes in the signal. The only change in data is due to band limitation and scale changes which are absorbed in the extracted wavelet of the new data set.

One of the advantages of carrying out a synthetic test with real data is to provide a realistic measure of how noise may affect the results. In an ideal synthetic example a perfect result may be obtained with a zero time lapse response but it is rather unrealistic when compared to real data sets.

Figure 11:
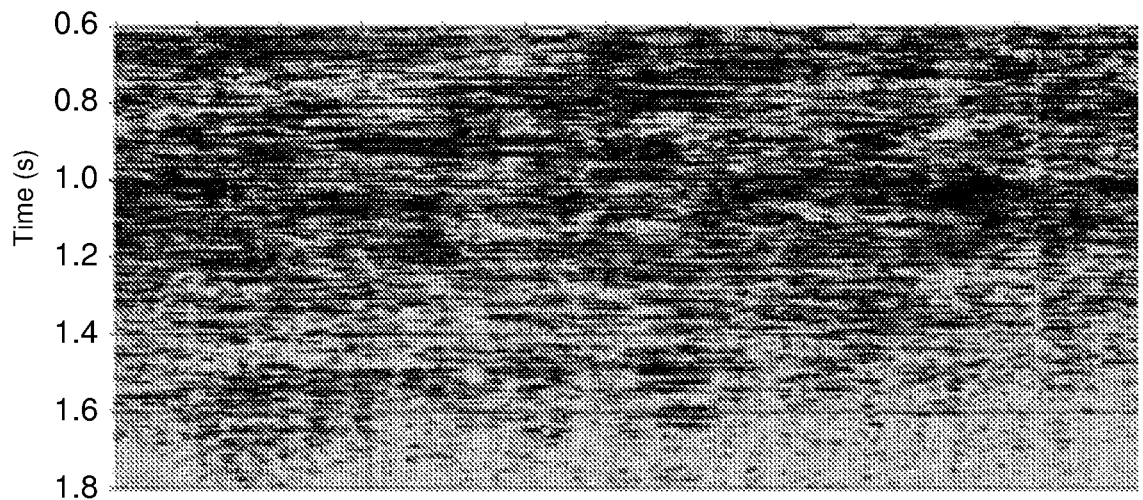
FIG. 11 illustrates intercept perturbation (changes) obtained by inverting the differenced data.

FIG. 11 illustrates intercept perturbation (changes) obtained by inverting the differenced data. The differenced data are generated by subtracting FIG. 7 from FIG. 9. The scale is same as in FIG. 8A. Note the poor signal to noise ratio and the section indicates that a time lapse change is present everywhere in the section.

Figure 12:
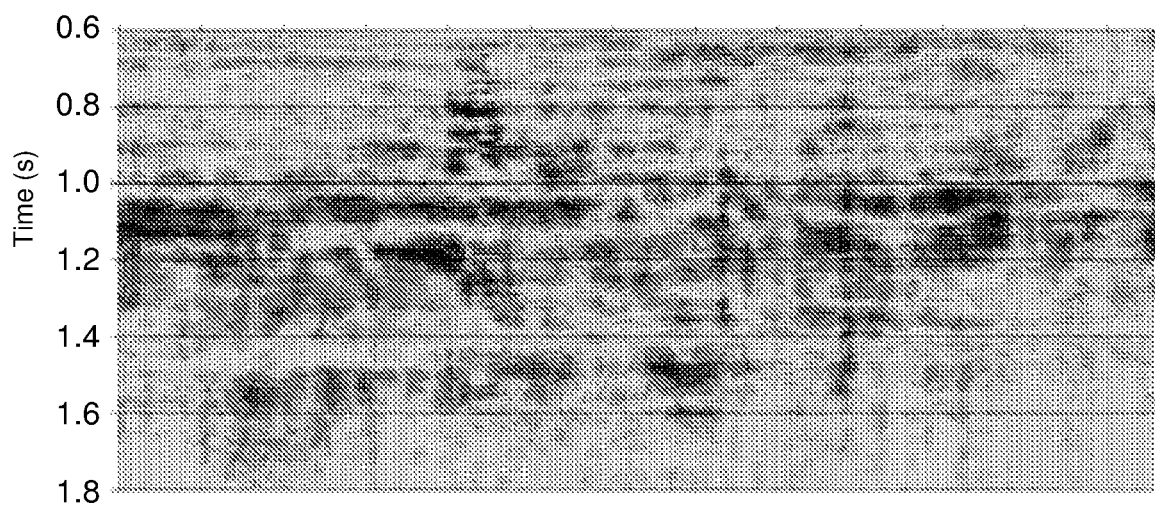
FIG. 12 illustrates intercept perturbation (changes) from obtained by inverting the difference data with higher noise assumptions than for FIG. 11.

The intercept section shown in FIG. 11 is obtained by inverting the data difference approach for the same data. The inversion shows significant artifacts indicating time lapse changes apparently exist everywhere in the section. Comparing FIG. 10 and FIG. 11 clearly indicates that the direct time lapse inversion produces significantly better result than data differencing. It is possible that noise assumptions included with inverting difference data may be wrong. One approach is to assign larger standard deviation to the differenced data and re-invert it. The resulting section in FIG. 12 shows reduced artifacts, however it is still worse compared to FIG. 10. FIG. 12 illustrates intercept perturbation (changes) obtained by inverting the difference data with higher noise assumptions than for FIG. 11. Although the artifacts are reduced compared to FIG. 11 they still dominate the whole section which is much poorer quality compared to FIG. 10.

Figure 13:
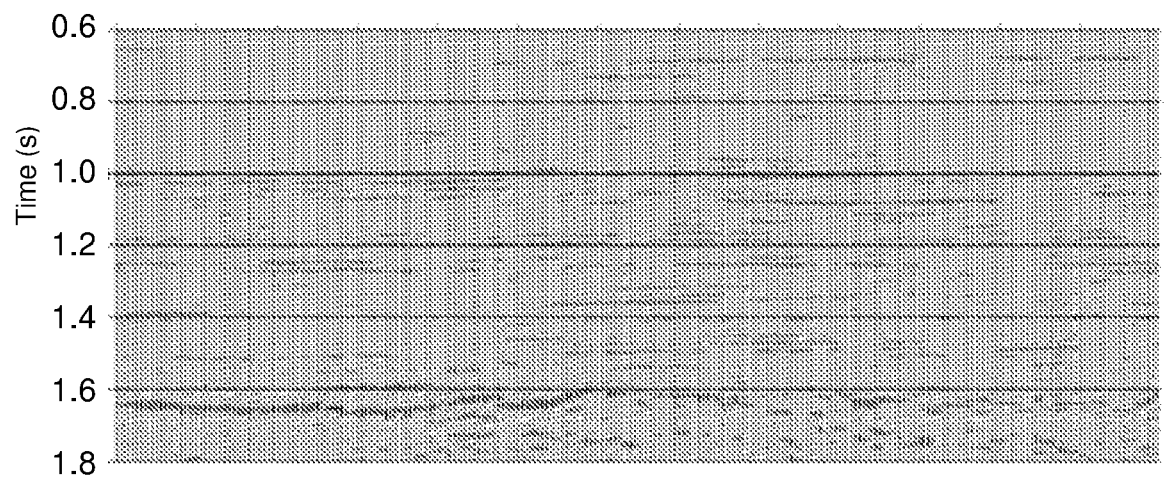
FIG. 13 illustrates gradient perturbation (changes) from direct time lapse inversion.
Figure 14:
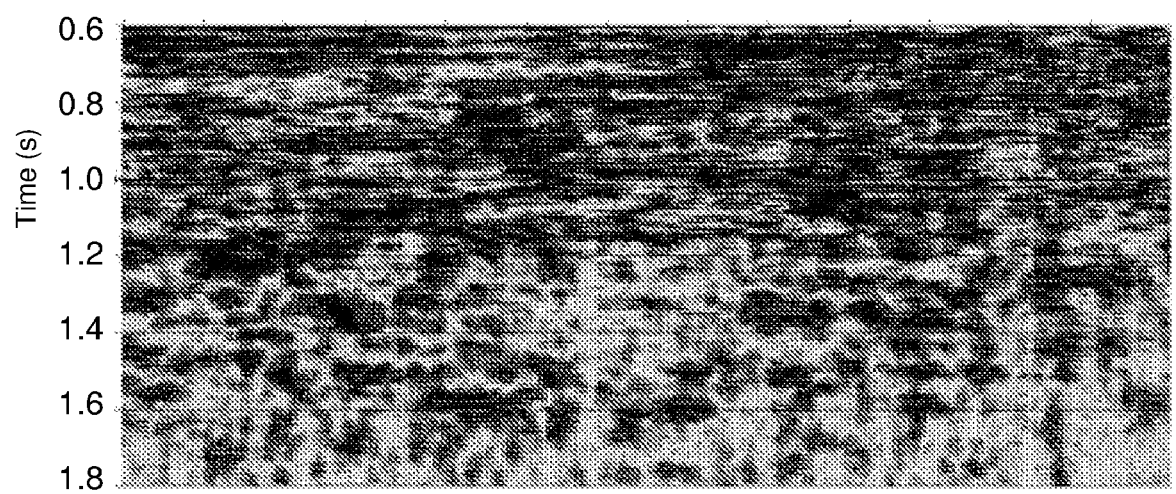
FIG. 14 illustrates gradient perturbation (changes) from obtained by inverting the difference data.

FIG. 13 illustrates gradient perturbation (changes) from direct time lapse inversion (scaled as in FIG. 8B). FIG. 14 illustrates gradient perturbation (changes) from obtained by inverting the difference data. The scale is same as in FIG. 8B. Note the poor signal to noise ratio and the section indicates time lapse change everywhere in the section. Comparing the gradient section obtained from time lapse inversion (FIG. 13) and by inverting the differenced data (FIG. 14) indicates that time lapse inversion is a more robust procedure to examine the changes than working with data differences.

Figure 15:
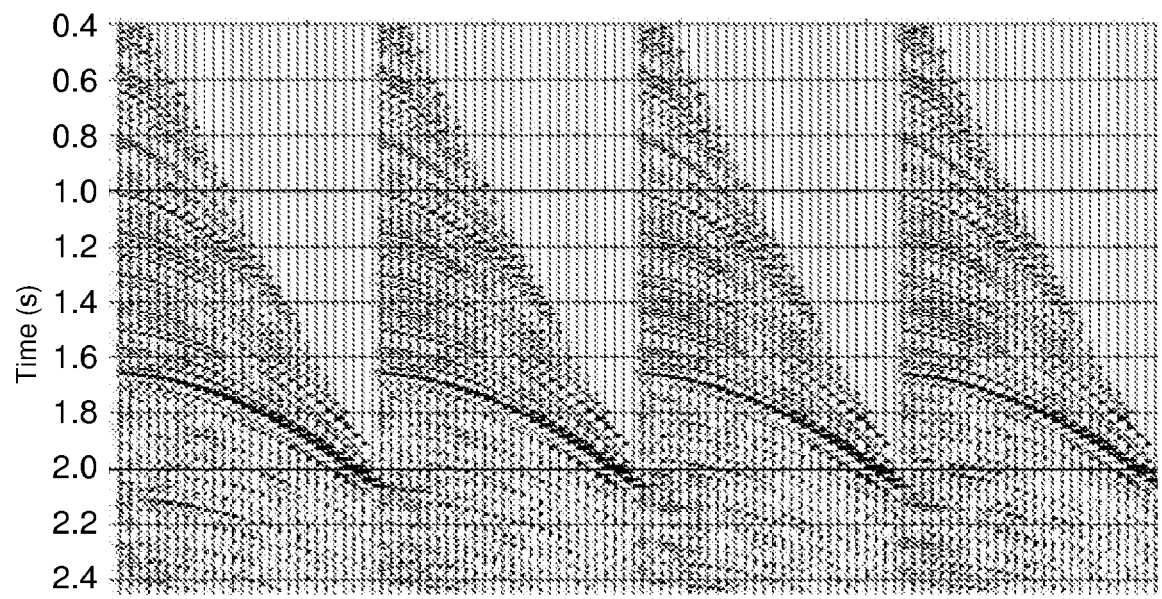
FIG. 15 illustrates phase rotated and band limited data from FIG. 7.
Figure 16A:
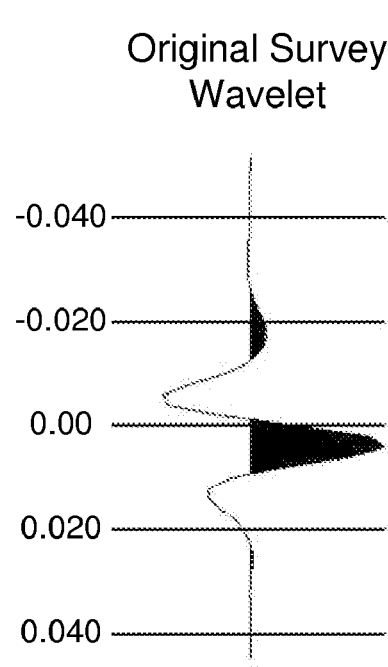
FIG. 16A is a wavelet obtained from the base field data.
Figure 16B:
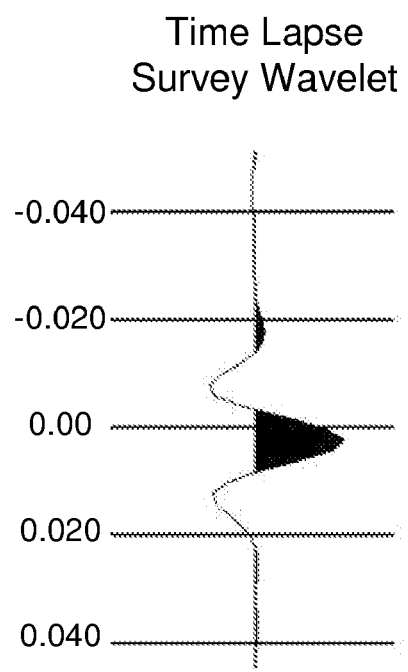
FIG. 16B is a wavelet obtained from the phase rotated and band limited data set in FIG. 15.

Example (b) Phase Rotation and Band-limitation Test: It is likely that data sets acquired between two different times during repeat survey have different phase information i.e. the source signature can be phase rotated between two surveys. To examine this aspect, Example (b) data are rotated by +30 degree and the resulting phase rotated band limited data are the time lapse survey data illustrated in FIG. 15. FIG. 16A and FIG. 16B illustrate a comparison of extracted wavelets. The wavelet in FIG. 16A is obtained from the base data. The wavelet in FIG. 16B is obtained from the phase rotated and band limited data set in FIG. 15. Note the change in the phase and scale (of the wavelets).

The extracted wavelet in FIG. 16B from the phase-rotated band limited data clearly indicates the phase change as well as band limitation. The original wavelet shows a phase of −30 degree and the phase of the new wavelet is close to zero degree suggesting that data is rotated by +30 degree.

Figure 17:
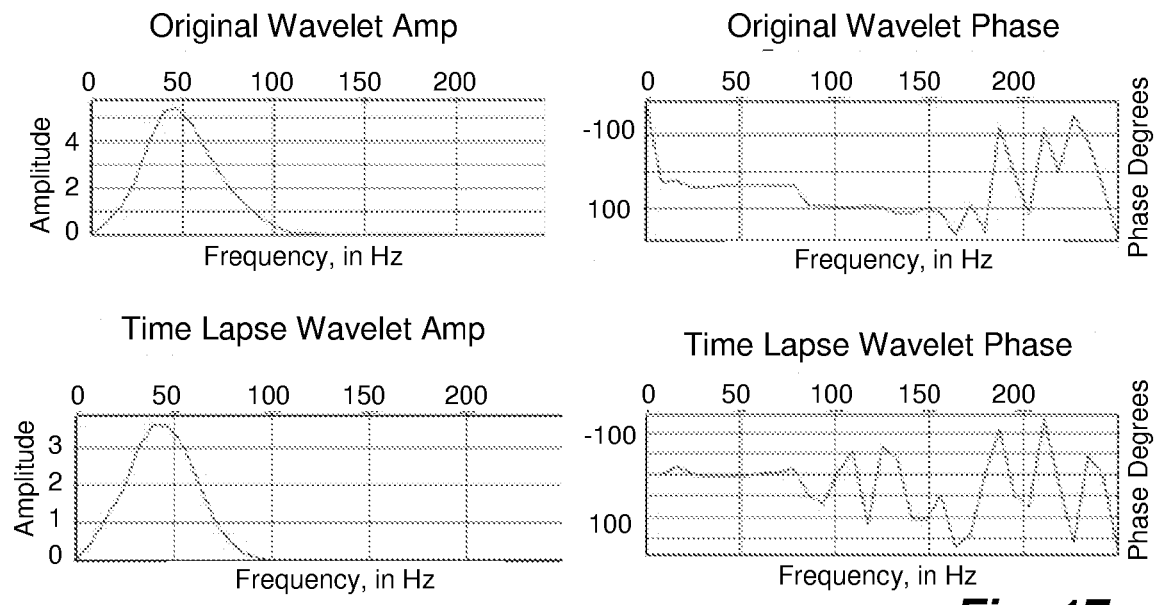
FIG. 17 illustrates information about the phase and amplitude of the original FIG. 16A wavelet and the time lapse FIG. 16B wavelet.

FIG. 17 illustrates information about the phase and amplitude of the original FIG. 16A wavelet and the time lapse FIG. 16B wavelet. FIG. 17 is a comparison of the amplitude (Original Wavelet Amp) and phase spectrum (Original Wavelet Phase) of the wavelets from the original base survey and the corollary time lapse survey amplitude (Time Lapse Wavelet Amp) and phase spectrum (Time Lapse Wavelet Phase) of the phase rotated and band limited data. The Original Wavelet Amp compared with Time Lapse Wavelet Amp clearly indicates the effect of band limitation. The time lapse survey wavelet has less bandwidth compared to the base survey wavelet. The Original Wavelet Phase compared with the Time Lapse Wavelet Phase panels illustrate that the inverted wavelet for the time lapse survey accurately recovers the phase. The original data has phase of −30 and the time lapse survey has phase close to zero degree.

Figure 18:
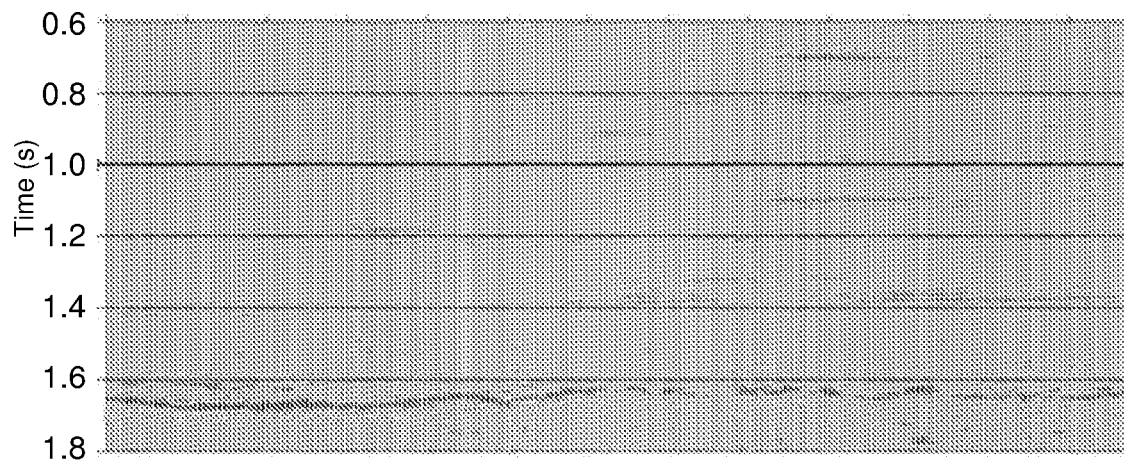
FIG. 18 illustrates intercept perturbation (changes) from direct time lapse inversion.

FIG. 18 illustrates intercept perturbation (changes) from direct time lapse inversion. The scale is same as in FIG. 8A. Direct time lapse inversion with the base intercept and gradient from FIG. 8A and FIG. 8B shows that the perturbation intercept has very low energy suggesting there is little or no time lapse change as illustrated with FIG. 18.

Figure 19:
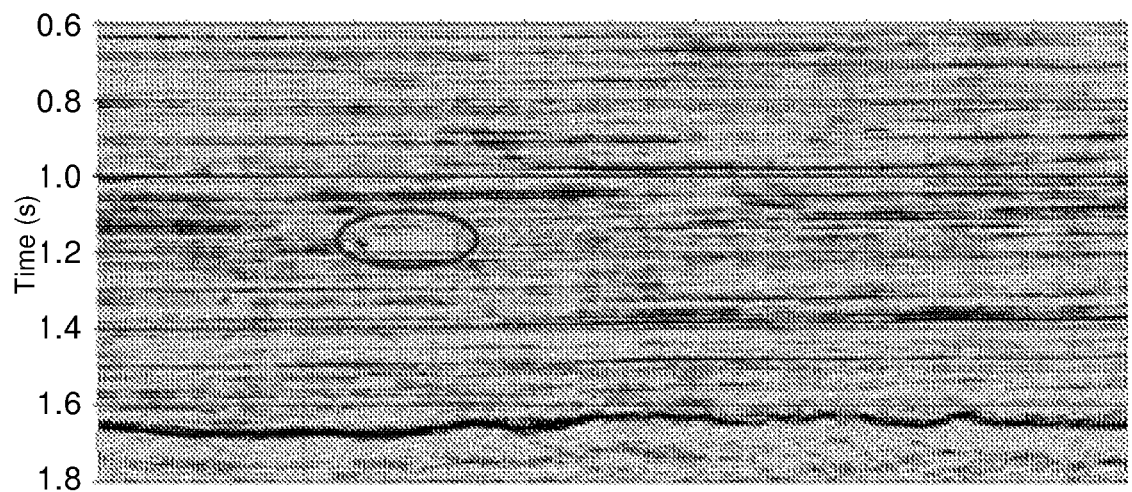
FIG. 19 is an illustration of an AVA perturbation test.

Example (c) Time Lapse AVA Perturbation Test: The change in the amplitude of the AVA parameters may be due to production. To simulate this change in physical property due to production, the AVA parameters are zeroed in a small region of the section shown in FIG. 19. If the data are sensitive to the change in that region it will be reflected in the time lapse inversion. The section in FIG. 19 is used as the base model in the time lapse inversion. The recovered intercept shown in FIG. 20 clearly indicates the presence of reflector that was removed in the base model. The intercept perturbation in FIG. 21 shows clear indication of the anomaly.

FIG. 19 is an illustration of an AVA perturbation test. In this example a small region in the intercept and gradient section is modified to zero amplitudes. Thus the reference model is the modified section with zero amplitudes and the time lapse data is the original survey that is sensitive to non-zero amplitudes of the AVA parameters. The goal is to determine if time lapse inversion is able to generate the AVA response with the modified model as the reference model.

Figure 20:
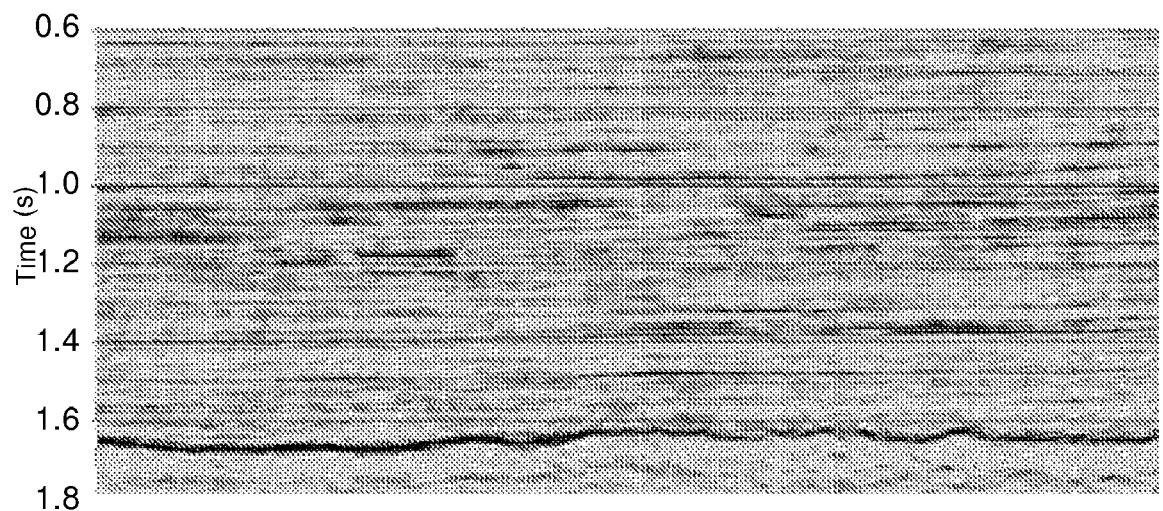
FIG. 20 illustrates the recovered intercept section after the time lapse inversion.
Figure 21:
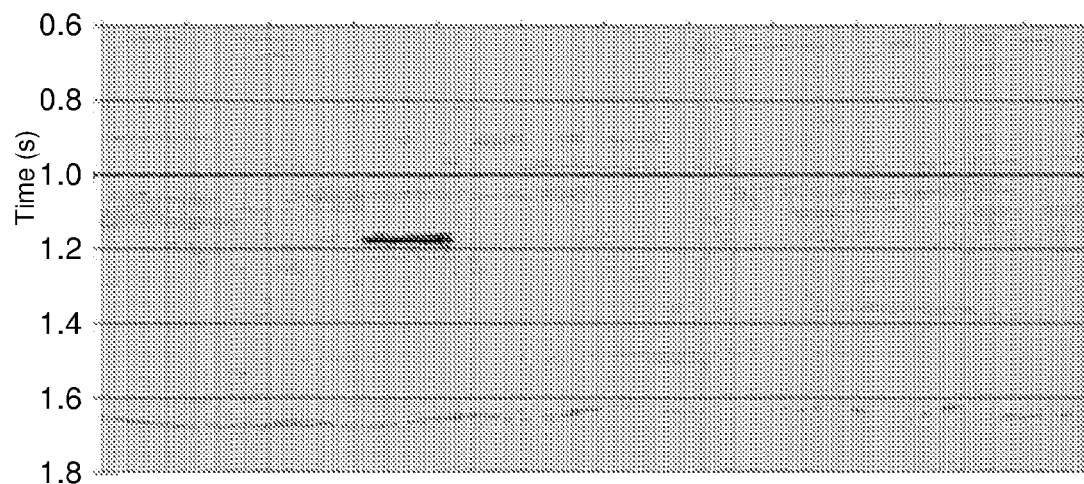
FIG. 21 illustrates the perturbation section for the intercept.

FIG. 20 illustrates the recovered intercept section after the time lapse inversion. Note the region where the traces were zeroed is now recovered indicating that the data were sensitive to the intercept and gradient information in that time window. FIG. 21 illustrates the perturbation section for the intercept. The time lapse inversion clearly reproduced the change in intercept values in the window where the perturbation was generated.

Figure 22:
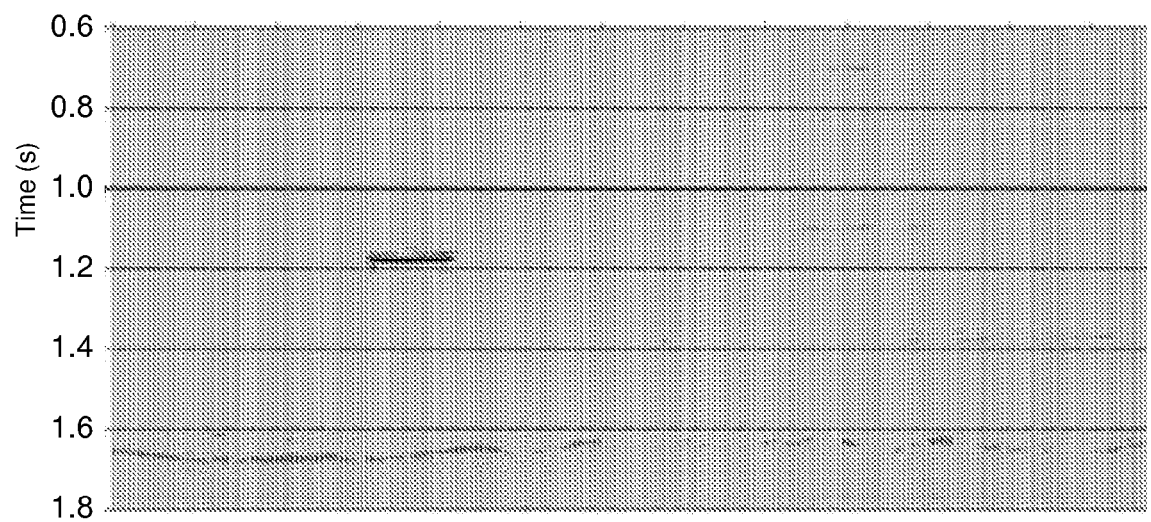
FIG. 22 illustrates the intercept perturbation section produced from the data that was phase rotated and band limited with the reference model given in FIG. 19.

Example (d) AVO perturbation with band limitation and phase rotation: In the last synthetic example is a realistic case where there are acquisition changes in addition to the physical property changes due to production. This example includes all of the previous effects into the data, i.e. phase rotation, band limitation and AVA perturbation. The intercept section obtained from the time lapse inversion in FIG. 22 clearly indicates the presence of the AVA anomaly. FIG. 22 illustrates the intercept perturbation section produced from the data that was phase rotated and band limited with the reference model given in FIG. 19.

Figure 23:
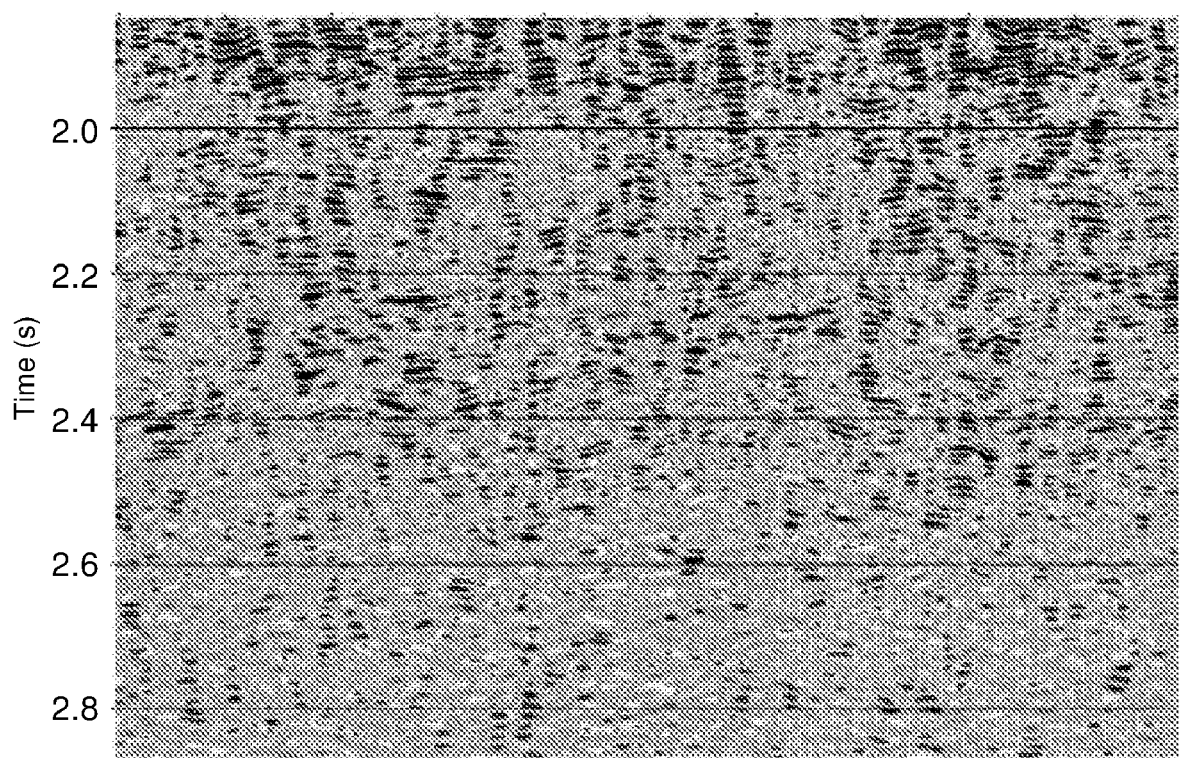
FIG. 23 illustrates an example of time lapse inversion for subtracting two data sets acquired 3 years apart and then inverting the difference.
Figure 24:
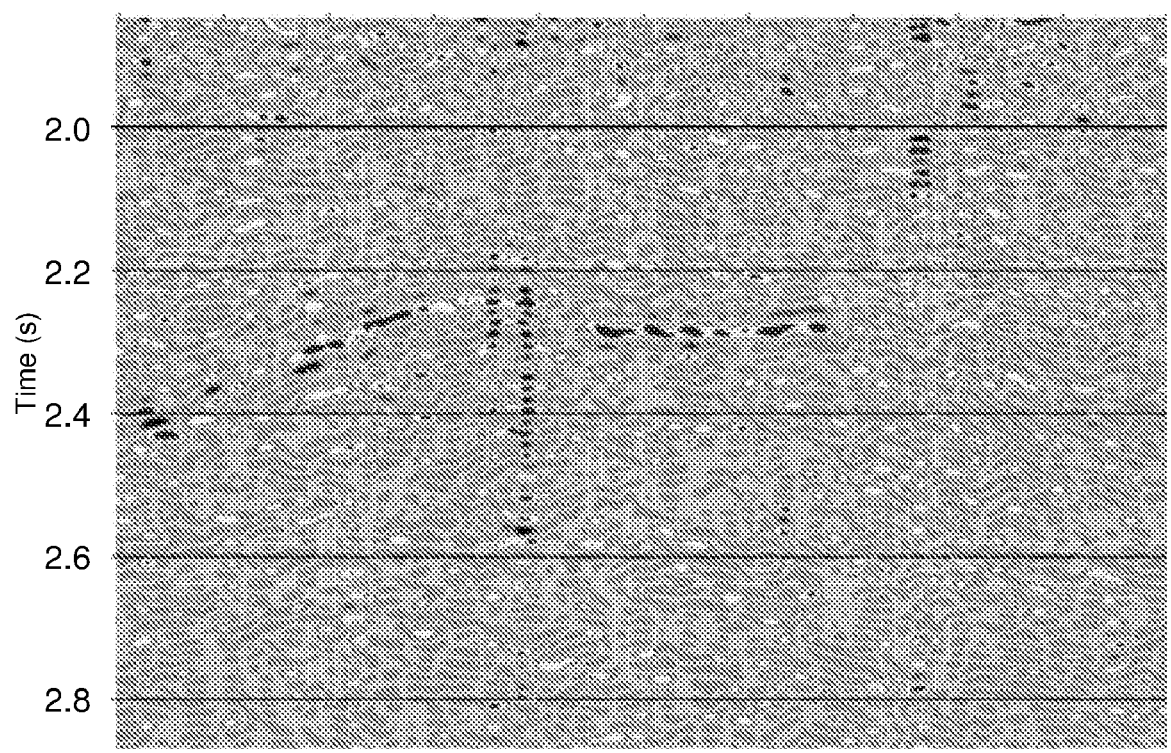
FIG. 24 illustrates a direct time lapse inversion result using the input data for FIG. 23.

FIG. 23 and FIG. 24 show the results from a data-differencing time lapse inversion and a direct time lapse inversion. FIG. 23 illustrates an intercept perturbation section obtained from time lapse inversion of data sets acquired in 2001 and 2004. The intercept section indicates that this data differencing produces apparent time lapse anomalies everywhere in the section. FIG. 24 illustrates a direct-time lapse inversion result between the 2001 and 2004 data sets. The intercept perturbation section shown in the diagram indicates that direct time lapse inversion produces indications of localized changes in a time lapse reservoir response. These changes coincide with the known production changes in the reservoir.

FIG. 24 clearly demonstrates the improvement of the time lapse result compared to data differencing results shown in FIG. 23. Thus for the field example presented it is clear that inaccuracies in the precise matching of the data sets between two different times reflect on the final results. Ability to avoid such artifacts via direct prestack time lapse inversion provides better results that are interpretable in terms of production changes. Undoubtedly, the quality of the time lapse response critically depends on signal to noise ratio.

Direct time lapse inversion is significantly better than the data differencing or model differencing approaches. Direct time lapse inversion is robust, efficient and flexible. Data differencing or model differencing between repeat surveys may require significant time investment for data conditioning to balance different data sets not needed for direct time lapse inversions. The inverted source wavelets obtained from the base and time lapse inversion absorb the variations due to propagation effects between the surveys including bandwidth variations, scaling, and time shifts. Biasing towards temporal continuity in the physical parameters (AVA) of the reservoir via model objective function(s) in direct time lapse inversion allows recovery of the time lapse reservoir changes in a robust manner.

If two different data sets have different offsets there is no need to discard offsets to force the data sets toward compatibility since data differencing is not a part of embodiments that include direct time lapse procedures. Likewise, there is no requirement to apply the same mute functions to all data sets to attempt to force compatibility.

Different noise levels in different data sets can be handled by choosing appropriate standard deviation via data weighting matrix. One choice is to use percentage of median estimate of amplitude as the standard deviation of data error. The ability to choose different noise estimates allows flexibility for regularizing the data sets differently. In the presence of noise, subtraction of two data sets can enhance the noise. By avoiding data differencing the higher signal to noise ratio of the time lapse response is an advantage that is preserved.

In one embodiment a method of seismic data processing to obtain a time-lapse data volume includes acquiring a first prestack seismic dataset and a second prestack seismic dataset wherein the second prestack seismic dataset has a time-lapse relationship to the first prestack seismic dataset. The first prestack seismic dataset is inverted for determination of a first source wavelet data set and a first reflectivity parameters data set. This may be termed a reference inversion. A perturbation data set is obtained by simultaneously minimizing an Lp-Norm between a portion of the first reflectivity parameters data set and reflectivity parameters for the second data set, an Lp-Norm between the first source wavelet data set and a source wavelet for the second data set and an Lp-Norm for data misfit between the first prestack seismic data set and the second prestack seismic data set.

The method is generalized so that the Lp-Norms are minimized, with p of any power, for reflectivities, wavelets and dataset misfits. In practice, the first and second reflectivity parameters Lp-Norm may be an L1-Norm. The first and second source wavelet data sets Lp-Norm may be an L2-Norm. The first and second prestack seismic data sets Lp-Norm for data misfit may be an L2-Norm.

In another aspect the perturbation dataset is inverted for at least one petrophysical parameter. The perturbation dataset or time-lapse data volume may be inverted for impedance, Poisson's ratio, density, fluid saturation, pressure, permeability, porosity, shear modulus, Lame's constant, or Young's modulus. In still another aspect intercept and gradient parameters may be determined using the first and second source wavelet data sets and the first and second reflectivity parameters data sets. The perturbation data may be displayed to represent temporal changes in reservoir characteristics. Inverting the first prestack seismic dataset for the first source wavelet data set, or the second prestack seismic dataset for the second source wavelet dataset, may include inverting for a source wavelet for each of several or all common image point gathers and determining an average source wavelet, respectively. Processes for determining average wavelets may include small amplitude random starting wavelets as initial models.

In another embodiment a method of seismic data processing to obtain a time-lapse data volume includes acquiring a first prestack seismic dataset and a second prestack seismic dataset wherein the second prestack seismic dataset has a time-lapse relationship to the first prestack seismic dataset. A reference inversion is determined by inverting the first prestack seismic dataset for determination of a first source wavelet data set and a first reflectivity parameters data set. A perturbation data set (or time-lapse dataset) is obtained by simultaneously minimizing an L1-Norm between a portion of the first reflectivity parameters data set and reflectivity parameters for the second data set, an L2-Norm between the first source wavelet data set and a source wavelet for the second data set and an L2-Norm for data misfit between the first prestack seismic data set and the second prestack seismic data set. The obtained time-lapse dataset output is recorded in a form for display.

In another aspect the time-lapse dataset may be inverted for one or more petrophysical parameters, for example parameters including but not limited to impedance, Poisson's ratio, density, fluid saturation, pressure, permeability, porosity, shear modulus, Lame's constant and Young's modulus. Intercept and gradient parameters may be determined using the first and second source wavelet data sets and the first and second reflectivity parameters data sets. Inverting the first prestack seismic dataset for the first source wavelet data set, or the second prestack seismic dataset for the second source wavelet dataset, may include inverting for a source wavelet for each of several or all common image point gathers and determining an average source wavelet, respectively. Processes for determining average wavelets may include small amplitude random starting wavelets as initial models.

Various aspects of embodiments in this disclosure and their equivalents may be undertaken with a seismic data processing system. A seismic data processing system may include any computer hardware and software combination operable to compute, classify, process, transmit, receive, retrieve, originate, switch, store, display, manifest, detect, record, reproduce, handle, or utilize any form of seismic information, intelligence, or data for business, scientific, control, or other purposes. For example, a seismic data processing system may be a personal computer, a super computer, a network storage device, or any other suitable device and may vary in size, shape, performance, functionality, and price. The seismic data processing may include random access memory (RAM), one or more processing resources such as a central processing unit (CPU) or hardware or software control logic, ROM, and/or other types of nonvolatile memory. Additional components of the seismic data processing system may include one or more disk drives, one or more network ports for communicating with external devices as well as various input and output (I/O) devices, such as a keyboard, a mouse, and a video display. The seismic data processing system may also include one or more buses operable to transmit communications between the various hardware components.

Figure 25:
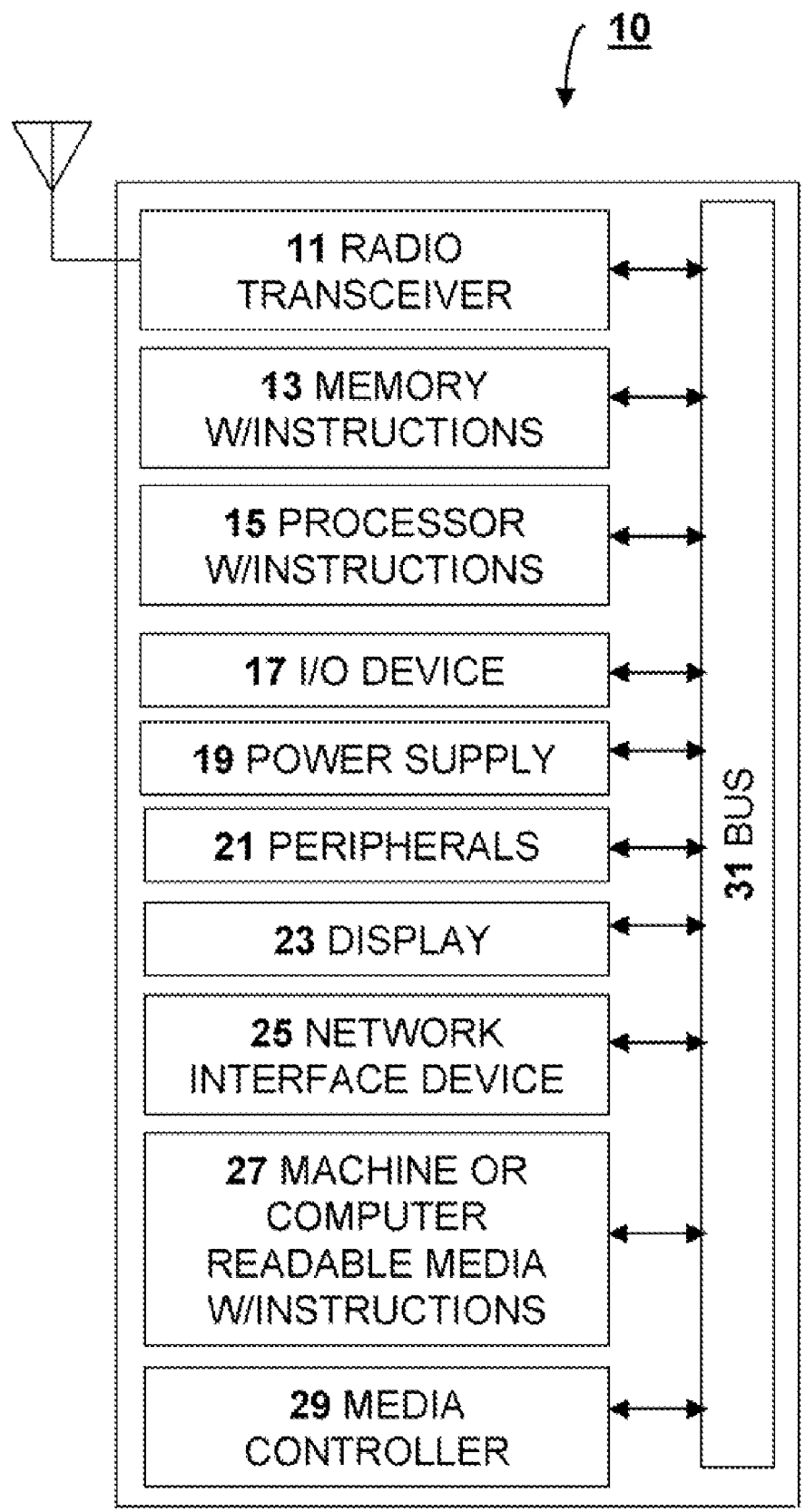
FIG. 25 illustrates an embodiment of a seismic data processing system within which a set of instructions may enable the system to perform any of the nonlimiting embodiments or their equivalents disclosed herein, including sets of application program interfaces.

An example of a seismic data processing system is illustrated with FIG. 25, an embodiment of a seismic data processing system within which a set of instructions may enable the system to perform any of the nonlimiting embodiments or their equivalents disclosed herein. A seismic data processing system may be a standalone system, computer, host computer, server or blade, or may be connected to other systems within a network. Seismic data processing system 10 may include a radio transceiver 11 connected to an antenna for providing wireless access to systems, networks and devices. In a networked deployment, the seismic data processing system may operate as a server or a client in server-client networked environment or as a member of a distributed network environment. Memory 13 may be volatile or non-volatile memory with instructions, programs and data. One or more central processing units (CPU) 15 or other processors including parallel processors may be included with instructions. The instructions may at least partially reside within the memory 13 and/or within the processor 15 during execution. Memory 13 and processor 15 may include machine-readable media.

Machine-readable media includes solid-state memory such as cards or other non-volatile memories, random access memories or other volatile memories, magneto-optical or optical media (e.g., disk or tape), or signals embodying computer instructions in a transmission medium. A machine-readable medium for the embodiments disclosed herein includes equivalents and successor media.

An input/output device 17 is provided to send data to, or receives data from, other system components or devices. At least one seismic data processing system bus 31 provides communication between and among components.

Additionally, seismic data processing system 10 may include peripherals 21 (keyboards, GPS receivers, USB adapter, headphones, microphone, wireless audio transmitter, print adapter, mouse, serial adapter, etc). Various types of display device 23 may be attached or linked with seismic data processing system 10. Network interface equipment such as Network Interface Controller 25 (NIC) may provide hard-wired access to infrastructure. Other interfaces may include a PCI bus, and USB ports, etc. A machine readable medium with instructions 27 may be on a disk drive device and provide additional software and data storage capability to seismic data processing system 10.

For example, computer readable medium 27 and memory 13 may include programs to process seismic data, which may be stored as program data and seismic data, according to the methods disclosed herein. The application program associated with the computer readable medium 27 may include at least one application program interface for receiving and/or processing seismic data. The program data may include seismic data acquired for processing according to embodiments disclosed herein, A set of application program interfaces residing on computer readable medium 27 or memory 13 may include at least one application interface associated with calculating a direct time-lapse inversion data set to locate temporal changes in subsurface reservoirs, or for determining other subsurface hydrocarbon reservoir parameters.

Processor 15 may carry out graphics/memory controller hub functions and enable input/output (I/O) functions for I/O device 17 and associated peripherals 21. Peripherals 21 such as a mouse, keyboard, and tablet are also coupled to other components at the option of the user. The seismic data processing system bus 31 may connect to I/O devices 17. Nonlimiting examples of a seismic data processing system bus may include a Peripheral Component Interconnect (PCI) bus, PCI Express bus, SATA bus or other bus is coupled to enable seismic data processing system bus 31 to be connected to other devices which provide seismic data processing system 10 with additional functionality. A universal serial bus (USB) or other I/O bus may be coupled to seismic data processing system bus 31 to facilitate the connection of peripheral devices 21 to seismic data processing system 10. System basic input-output system (BIOS) may be coupled to processor 15. BIOS software is stored in nonvolatile memory 13 such as CMOS or FLASH memory. A network interface controller (NIC) 25 is coupled to processor 15 to facilitate connection of system 10 to other data, information or seismic data processing systems. A media drive controller 29 is coupled to processor 15 through bus 31. An example of a media drive controller may include a baseboard management controller (BMC). Devices that can be coupled to media drive controller 29 include CD-ROM drives, DVD drives hard disk drives and other fixed or removable media drives. It should be understood that the technology disclosed herein is not only applicable to the embodiment of FIG. 25 but is also applicable to the other types of seismic data processing systems.

In still another embodiment associated with a seismic data processing system a set of application program interfaces embodied on a computer readable medium for execution by a processor for calculating a direct time-lapse inversion data set to locate temporal changes in subsurface reservoirs includes a first interface that receives a first prestack seismic dataset and a second prestack seismic dataset wherein the second prestack seismic dataset has a time-lapse relationship to the first prestack seismic dataset. The set of application interfaces also includes a second interface that receives a first source wavelet data set inverted from the first prestack seismic dataset, a third interface that receives a first reflectivity parameters dataset inverted from the first prestack seismic dataset and a fourth interface that receives a perturbation dataset determined from a simultaneous minimization of an L1-Norm between a portion of the first reflectivity parameters data set and reflectivity parameters for the second data set, an L2-Norm between the first source wavelet data set and a source wavelet for the second data set and an L2-Norm for data misfit between the first prestack seismic data set and the second prestack seismic data set. A fifth interface may receive petrophysical parameters inverted from the perturbation dataset. A sixth interface may receive intercept and gradient parameters determined using the first and second source wavelet data sets and the first and second reflectivity parameters data sets. A seventh interface may receive an average source wavelet from an inversion of a plurality of common image point gathers from one of: the first prestack seismic dataset and the second prestack seismic dataset.

While various embodiments have been shown and described, various modifications and substitutions may be made thereto without departing from the spirit and scope of the invention. Accordingly, it is to be understood that the present invention has been described by way of illustrations and not limitation.

What is claimed is:

1. A method of seismic data processing comprising:
   a) acquiring a first prestack seismic dataset and a second prestack seismic dataset wherein the second prestack seismic dataset has a time-lapse relationship to the first prestack seismic dataset;
   b) inverting the first prestack seismic dataset for determination of a first source wavelet data set and a first reflectivity parameters data set;
   c) obtaining a perturbation data set by using a computer to simultaneously minimize:
      i) an Lp-Norm between a portion of the first reflectivity parameters data set and reflectivity parameters for the second data set;
      ii) an Lp-Norm between the first source wavelet data set and a source wavelet for the second data set;
      iii) an Lp-Norm for data misfit between the first prestack seismic data set and the second prestack seismic data set.

2. The method of claim 1 further comprising inverting the perturbation dataset for at least one petrophysical parameter.

3. The method of claim 1 further comprising inverting the perturbation dataset to obtain at least one of: i) impedance, ii) Poisson's ratio, iii) density, iv) fluid saturation, v) pressure, vi) permeability, vii) porosity, viii) shear modulus, ix) Lame's constant. and x) Young's modulus.

4. The method of claim 1 further comprising determining intercept and gradient parameters using the first and second source wavelet data sets and the first and second reflectivity parameters data sets.

5. The method of claim 1 wherein the first and second reflectivity parameters Lp-Norm is an L1-Norm.

6. The method of claim 1 wherein the first and second source wavelet data sets Lp-Norm is an L2-Norm.

7. The method of claim 1 wherein the first and second prestack seismic data sets Lp-Norm for data misfit is an L2-Norm.

8. The method of claim 1 further comprising displaying the perturbation dataset.

9. The method of claim 1 wherein inverting the first prestack seismic dataset for determination of the first source wavelet data set includes inverting for a source wavelet for each of a plurality of common image point gathers and determining an average source wavelet.

10. The method of claim 1 wherein inverting the second prestack seismic dataset for determination of the second source wavelet data set includes inverting for a source wavelet for each of a plurality of common image point gathers and determining an average source wavelet.

11. A method of seismic data processing to obtain a time-lapse data volume comprising:
   a) acquiring a first prestack seismic dataset and a second prestack seismic dataset wherein the second prestack seismic dataset has a time-lapse relationship to the first prestack seismic dataset;
   b) inverting the first prestack seismic dataset for determination of a first source wavelet data set and a first reflectivity parameters data set;
   c) obtaining a perturbation data set by simultaneously minimizing:
      i) an L1-Norm between a portion of the first reflectivity parameters data set and reflectivity parameters for the second data set;
      ii) an L2-Norm between the first source wavelet data set and a source wavelet for the second data set;
      iii) an L2-Norm for data misfit between the first prestack seismic data set and the second prestack seismic data set; and
   d) recording the perturbation data set as a time-lapse data volume in a form for display.

12. The method of claim 11 further comprising inverting the perturbation dataset for petrophysical parameters.

13. The method of claim 11 further comprising inverting the perturbation dataset to obtain at least one of: i) impedance, ii) Poisson's ratio, iii) density, iv) fluid saturation, v) pressure, vi) permeability, vii) porosity, viii) shear modulus, ix) Lame's constant, and x) Young's modulus.

14. The method of claim 11 further comprising determining intercept and gradient parameters using the first and second source wavelet data sets and the first and second reflectivity parameters data sets.

15. The method of claim 11 wherein inverting the first prestack seismic dataset for determination of the first source wavelet data set includes inverting for a source wavelet for each of a plurality of common image point gathers and determining an average source wavelet.

16. The method of claim 11 wherein inverting the second prestack seismic dataset for determination of the second source wavelet data set includes inverting for a source wavelet for each of a plurality of common image point gathers and determining an average source wavelet.

* * * * *